US012647038B2

(12) United States Patent
Trainer et al.

(10) Patent No.: US 12,647,038 B2
(45) Date of Patent: Jun. 2, 2026

(54) ELECTRICAL POWER SYSTEM

(71) Applicant: ROLLS-ROYCE PLC, London (GB)

(72) Inventors: David R Trainer, Derby (GB); Mark Sweet, Chesterfield (GB); Cezary P Makulec, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 18/895,743

(22) Filed: Sep. 25, 2024

(65) Prior Publication Data

US 2025/0125736 A1 Apr. 17, 2025

(30) Foreign Application Priority Data

Oct. 13, 2023 (GB) ..................................... 2315703

(51) Int. Cl.
*B64D 47/00* (2006.01)
*H02J 1/08* (2026.01)
(Continued)

(52) U.S. Cl.
CPC ........ *H02M 3/33584* (2013.01); *B64D 47/00* (2013.01); *H02J 1/082* (2020.01);
(Continued)

(58) Field of Classification Search
CPC . B64D 47/00; H02J 1/082; H02J 1/08; H02M 1/0058; H02M 1/32; H02M 1/325;
(Continued)

(56) References Cited

U.S. PATENT DOCUMENTS 9,893,633 B1 2/2018 Li et al.
2011/0292688 A1* 12/2011 Zhang ..................... H02M 1/32
363/21.02
(Continued)

FOREIGN PATENT DOCUMENTS

CN 109698627 * 4/2019
CN 109698627 A 4/2019
(Continued)

OTHER PUBLICATIONS

Bo Yang et al. "Over Current Protection Methods for LLC Resonant Converter". 18th Annual IEEE Applied Power Electronic Conference and Exposition, Feb. 9, 2003, vol. 2, pp. 605-609.
(Continued)

*Primary Examiner* — Rexford N Barnie
*Assistant Examiner* — Xuan Ly
(74) *Attorney, Agent, or Firm* — Oliff PLC

(57) ABSTRACT
A DC:DC converter includes: a DC:AC converter circuit having DC and AC sides; an AC:DC converter circuit having DC and sides; an AC link connecting the AC side of the DC:AC circuit and the AC side of the AC:DC converter circuit, the AC link including a transformer having a first winding connected to the AC side of the DC:AC converter circuit and a second winding connected to the AC side of the AC:DC converter; a capacitor; and a switch arrangement having a first state and a second state, wherein: in the first state, the capacitor is connected in series between the AC side of the DC:AC converter circuit and the first winding of the transformer; and in the second state, there is a current path between the AC side of the DC:AC converter circuit and the first winding of the transformer that does not include the capacitor.

17 Claims, 15 Drawing Sheets

(51) Int. Cl.

| | |
|---|---|
| *H02J 1/082* | (2026.01) |
| *H02M 1/32* | (2007.01) |
| *H02M 3/00* | (2006.01) |
| *H02M 3/335* | (2006.01) |

(52) U.S. Cl.
CPC ............. *H02M 1/325* (2021.05); *H02M 3/01* (2021.05); *H02M 3/33573* (2021.05)

(58) Field of Classification Search
CPC ............... H02M 3/01; H02M 3/33573; H02M 3/33584; H02M 3/00; H02M 3/335
USPC ......................................................... 307/9.1
See application file for complete search history.

(56)                References Cited

U.S. PATENT DOCUMENTS

| | | | | |
|---|---|---|---|---|
| 2017/0353104 | A1 | 12/2017 | Soldner et al. | |
| 2019/0315481 | A1* | 10/2019 | Elliott | B64D 41/00 |
| 2020/0140101 | A1* | 5/2020 | Long | B64D 27/33 |
| 2023/0134788 | A1 | 5/2023 | Trainer et al. | |
| 2024/0039416 | A1 | 2/2024 | Choudhury et al. | |
| 2024/0128019 | A1* | 4/2024 | Yin | H01F 27/006 |

FOREIGN PATENT DOCUMENTS

| | | | | |
|---|---|---|---|---|
| CN | 109698627 | B | | 11/2020 |
| CN | 115378268 | A | | 11/2022 |
| CN | 116526816 | A | | 8/2023 |
| EP | 4 160 897 | A1 | | 4/2023 |
| EP | 4 175 148 | A1 | | 5/2023 |
| JP | 4160897 | | * | 5/2023 |
| KR | 10-2021-0030657 | A | | 3/2021 |
| WO | 2022/034728 | A1 | | 2/2022 |

OTHER PUBLICATIONS

Chen et al., "Fault Characteristics and Riding-Through Methods of Dual Active Bridge Converter Under Short-Circuit of the Load," IEEE Transactions on Power Electronics, Aug. 2024, vol. 36, No. 8, pp. 9578-9591.

Chaoran et al., "Research on Fault Current Limitation and Active Control for Power Electronic Transformer in Direct Current Grid," IET Generation, Transmission & Distribution, The Institution of Engineering and Technology, Nov. 2020, vol. 15, No. 1, pp. 121-134.

Fadel, Maurice; "DC microgrids and battery charging"; 3rd International Conference on Smart Grid and Renewable Energy, pp. 1-5, 2022.

* cited by examiner

ELECTRICAL POWER SYSTEM

CROSS-REFERENCE TO RELATED APPLICATIONS

This specification is based upon and claims the benefit of priority from United Kingdom Patent Application No. 2315703.5, filed on 13 Oct. 2023, the entire contents of which are incorporated herein by reference.

TECHNICAL FIELD

This disclosure relates to an electrical power system comprising a DC:DC power electronics converter. A method of operating an electrical power system is also described.

BACKGROUND

A DC:DC power electronics converter may be used to interface between two DC parts of an electrical power system. For example, an electrical power system may have two DC electrical networks with different operating voltages, and a DC:DC converter may provide an interface between the two networks so that power can be exchanged between them. In another example, an electrical power system may include a DC electrical network that is supplied with power by an energy storage system (e.g., a battery). The terminal voltage of a battery typically decreases with its state of charge, so a DC:DC converter may be provided between the terminals of the energy storage system and the DC electrical network to stabilise the voltage supplied to the DC electrical network as the battery discharges.

SUMMARY

According to a first aspect, there is a DC:DC power electronics converter. The DC:DC converter comprises:

a DC:AC converter circuit having a DC side and an AC side;

an AC:DC converter circuit having a DC side and an AC side;

an AC link connecting the AC side of the DC:AC circuit and the AC side of the AC:DC converter circuit, the AC link including a transformer having a first winding connected to the AC side of the DC:AC converter circuit and a second winding connected to the AC side of the AC:DC converter;

a capacitor; and a switch arrangement having a first state and a second state.

In the first state, the capacitor is connected in series between the AC side of the DC:AC converter circuit and the first winding of the transformer. In the second state, there is a current path between the AC side of the DC:AC converter circuit and the first winding of the transformer that does not include the capacitor.

In an embodiment, the switch arrangement comprises a mechanical AC switch or a semiconductor switch connected in parallel with the capacitor. An example of a mechanical AC switch is a mechanical contactor. An example of a semiconductor switch is two reverse-series connected transistors. The transistors may be MOSFETs, IGBTs or any other suitable transistors.

Each of the DC:AC converter circuit and the AC:DC converter circuit can take any suitable form. In an embodiment, each of the DC:AC converter circuit and the AC:DC converter circuit is an H-bridge circuit.

In an embodiment, both the DC:AC converter circuit and the AC:DC converter circuit are active converter circuits. In another embodiment, the DC:AC converter circuit is an active circuit, while the AC:DC converter circuit is a passive diode rectifier. In an embodiment, the DC:AC converter circuit and the AC:DC converter circuit are bi-directional converter circuits.

In an embodiment, the DC:DC converter further comprises: a second capacitor; and a second switch arrangement having a first state and a second state. In the first state of the second switch arrangement, the second capacitor is connected between the AC side of the AC:DC converter circuit and the second winding of the transformer; in the second state of the second switch arrangement, there is a current path between the AC side of the AC:DC converter circuit and the second winding of the transformer that does not include the second capacitor.

In an embodiment, the first winding of the transformer has a first number of turns and the second winding of the transformer has a second number of turns different from the first number of turns.

In an embodiment, a turns ratio, defined as the ratio of the first and second numbers of turns, is equal to a desired ratio of the voltages at the two DC sides of the DC:DC converter. In one specific example, the turns ratio is about two.

According to a second aspect, there is an electrical power system, comprising: a DC:DC power electronics converter according to the first aspect; and a control system. The control system is configured to control the switch arrangement, or each switch arrangement if both the first and second switch arrangements of the first aspect are present.

In an embodiment, the control system also controls a switching operation of a plurality of transistors of the DC:AC converter circuit and/or the AC:DC converter circuit. In an embodiment, the control system controls one or more of: a switching frequency of the transistors, a switching pattern of the transistors; a duty cycle of the transistors.

The control system can take any suitable form. For example, the control system may be a single controller, or multiple distributed controllers. It may be implemented in hardware and/or software.

In an embodiment, the DC side of the DC:AC converter circuit is connected to a DC power source, and the DC side of the AC:DC converter circuit may be connected to a DC electrical network.

In an embodiment, the DC power source is or comprises an energy storage system. In an embodiment, the DC power source is another DC electrical network. Where the DC power source is a further DC electrical network, the further DC electrical network may interface with an energy storage system.

In an embodiment, the control system is configured to control the state of the switch arrangement based on an operating condition of the DC electrical network. In an embodiment, the control system is configured to change the state of the switch arrangement in response to determining there has been a change in the operating condition of the DC electrical network.

In an embodiment, the switch arrangement is normally in the first state and the control system is configured to switch the switch arrangement into the second state in response to a determination that there is a fault in the DC electrical network. The expression "normally" is used here to refer to operation of the system as intended, without a fault in the DC network. Therefore, the DC:DC converter may normally be operated as a resonant LLC DC:DC converter and, if a fault in the DC network is detected, be reconfigured to operate as, e.g., a DAB DC:DC converter.

In an embodiment, the DC:AC converter circuit comprises a first plurality of transistors and the control system is configured to control a switching operation of the first plurality of transistors.

In an embodiment, the control system is further configured to, responsive to a determination that there is a fault in the DC electrical network: control the switching operation of the first plurality of transistors to control an amount of current fed, from the DC power source, to the DC electrical network through the DC:DC converter.

In an embodiment, controlling the switching operation of the first plurality of transistors to control an amount of current fed, from the DC power source, to the DC electrical network through the DC:DC converter comprises any one or more of:

increasing a switching frequency of the first plurality of transistors to increase an impedance of the AC link of the DC:DC converter;

modifying the switching operation of the first plurality of transistors so that a waveform of a voltage applied to the first winding of the transformer changes from a square wave to a quasi-square wave;

modifying the switching operation of the first plurality of transistors so that a duty cycle of a waveform of a voltage applied to the first winding of the transformer changes.

In an embodiment, the AC:DC converter circuit comprises a second plurality of transistors and the control system is configured to control a switching operation of the second plurality of transistors of the AC:DC converter circuit.

In an embodiment, the control system is further configured to, responsive to a determination that there is a fault in the DC electrical network, control the switching operation of the second plurality of transistors to control an amount of current fed from the DC power source to the DC electrical network through the DC:DC converter.

In an embodiment, controlling the switching operation of the second plurality of transistors to control an amount of current fed to the DC electrical network through the DC:DC converter comprises: controlling the switching operation of the plurality of transistors of the AC:DC converter circuit to repeatedly switch the AC:DC converter circuit between a fault feeding configuration and a crowbar configuration.

In the fault feeding configuration, current passes through the DC:AC converter circuit to the DC electrical network. In an embodiment, a low-side transistor of a first half-bridge of the AC:DC converter circuit and a high-side transistor of a second half-bridge of the AC:DC converter circuit may be switched on, whereby current passes through the AC:DC converter circuit to the DC electrical network.

In the crowbar configuration, current is contained within (e.g., circulates within) the AC:DC converter circuit and does not pass to the DC electrical network. In an embodiment, only low-side transistors or only high-side transistors of the AC:DC converter circuit may be switched on, whereby current is contained within the AC:DC converter circuit and does not pass to the second DC electrical network.

In an embodiment, the control system is configured to control the state of the switch arrangement based on a voltage or electrical power demand of one or more loads supplied by the DC electrical network.

In an embodiment, the control system is configured to: switch the switch arrangement from the first state to the second state in response to the electrical power demand passing below a first power demand threshold; and/or switch the switch arrangement from the second state to the first state in response to the electrical power demand exceeding a second power demand threshold.

In an embodiment, the control system is configured to: change the state of the switch arrangement when a voltage across the capacitor is at a minimum during an AC cycle of the AC link.

The electrical power system may be or form part of an aircraft power and propulsion system. The power and propulsion system may be a purely electric power and propulsion system, a hybrid propulsion (e.g., gas turbine and battery/fuel cell hybrid, or battery and fuel cell hybrid system), or a 'more electric' propulsion system having propulsive gas turbine engines that interface with an electrical power system through spool-coupled electrical machines.

According to a third aspect, there is provided an aircraft comprising: the DC:DC converter of the first aspect; or the electrical power system of the second aspect.

According to a fourth aspect, there is a method of operating an electrical power system. The electrical power system comprises a DC:DC converter according to the first aspect and a control system configured to control the switch arrangement. The DC side of the DC:AC converter circuit is connected to a DC power source, and the DC side of the AC:DC converter circuit is connected to a DC electrical network. The method comprises:

determining, by the control system, a change in an operating condition of the DC electrical network; and in response to determining the change in the operating condition of the DC electrical network, changing the state of the switch arrangement.

In an embodiment, determining the change in the operating condition of the DC electrical network one or more of: determining that there is a fault in the DC electrical network; determining that an electrical power demand associated with one or more loads supplied by the DC electrical network has changed; determining that a voltage demand of the DC electrical network has changed.

In an embodiment, the control system changes the state of the switch arrangement when a voltage across the capacitor is at a minimum during an AC cycle of the AC link.

The skilled person will appreciate that except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

5

Figure 4A:
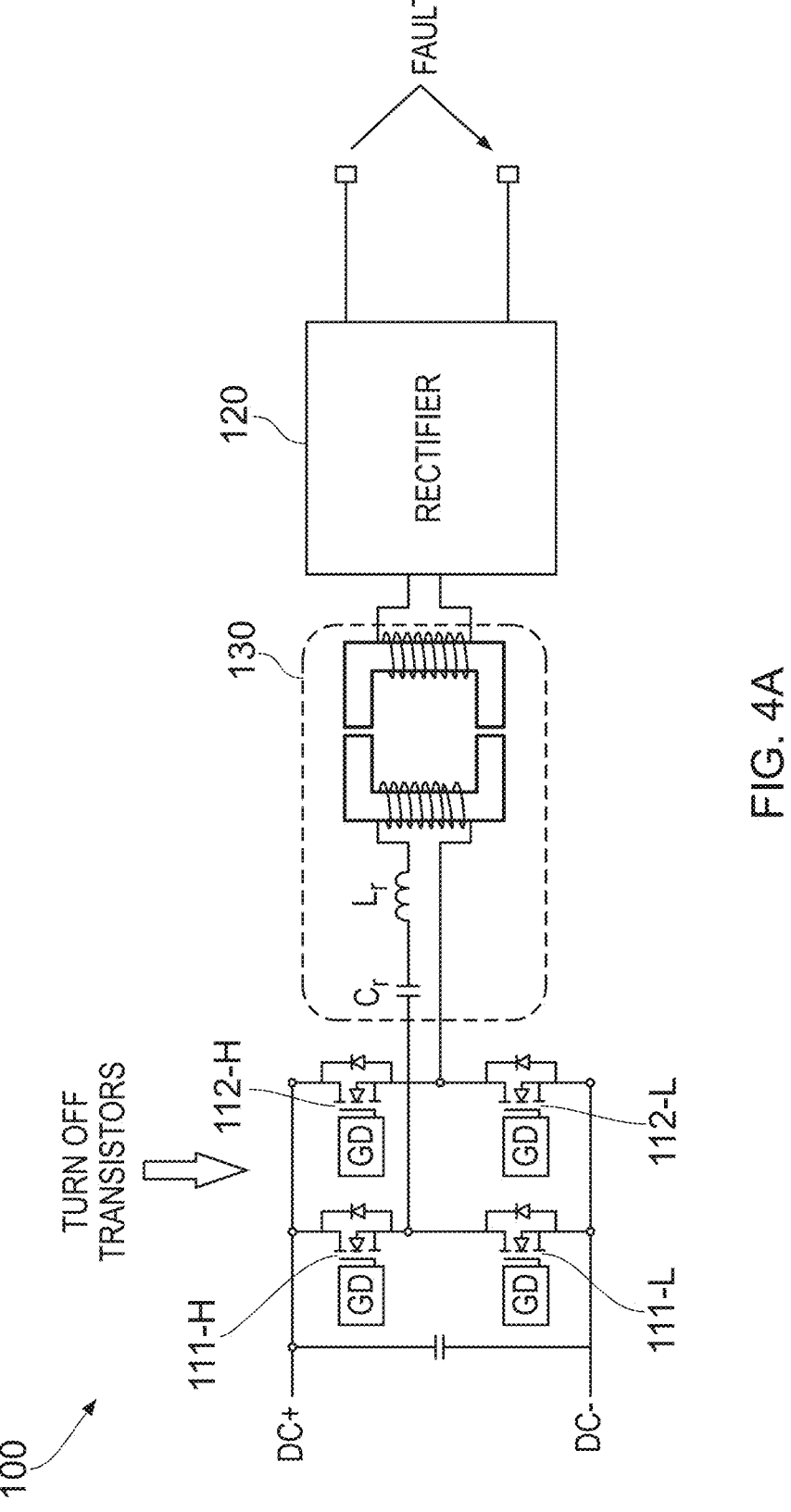
Figure 4B:
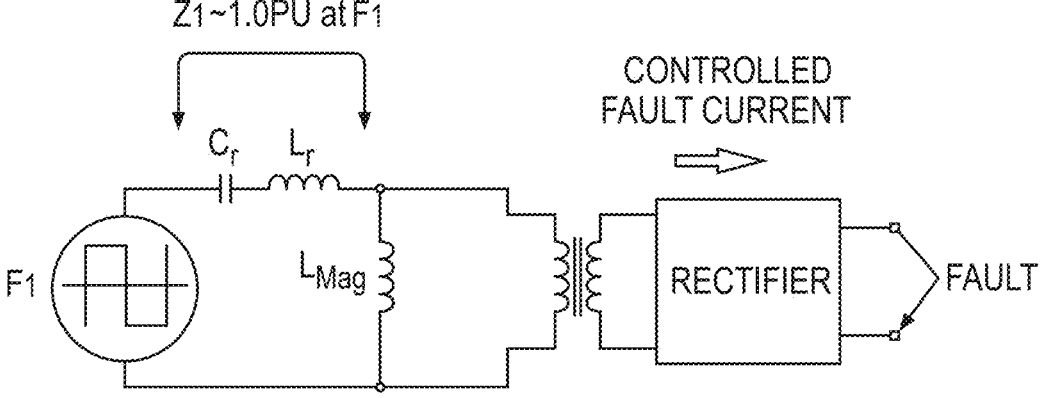
Figure 4C:
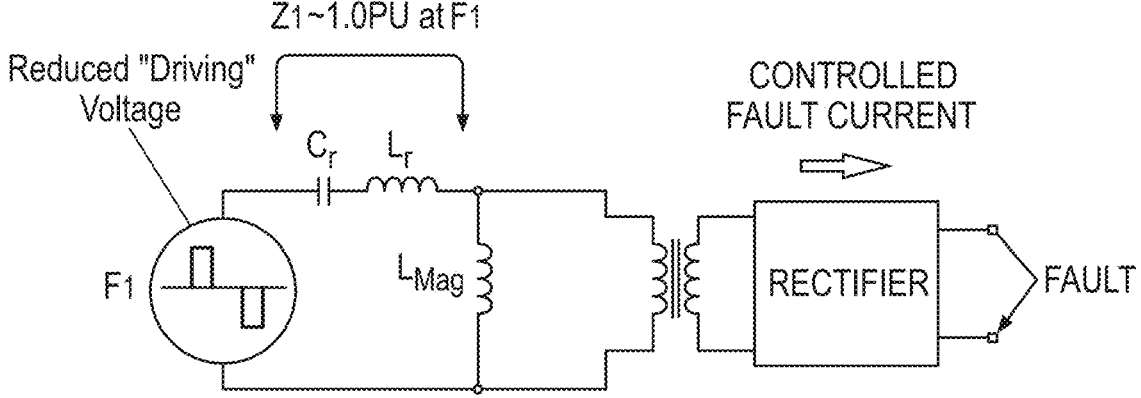
Figure 5A:
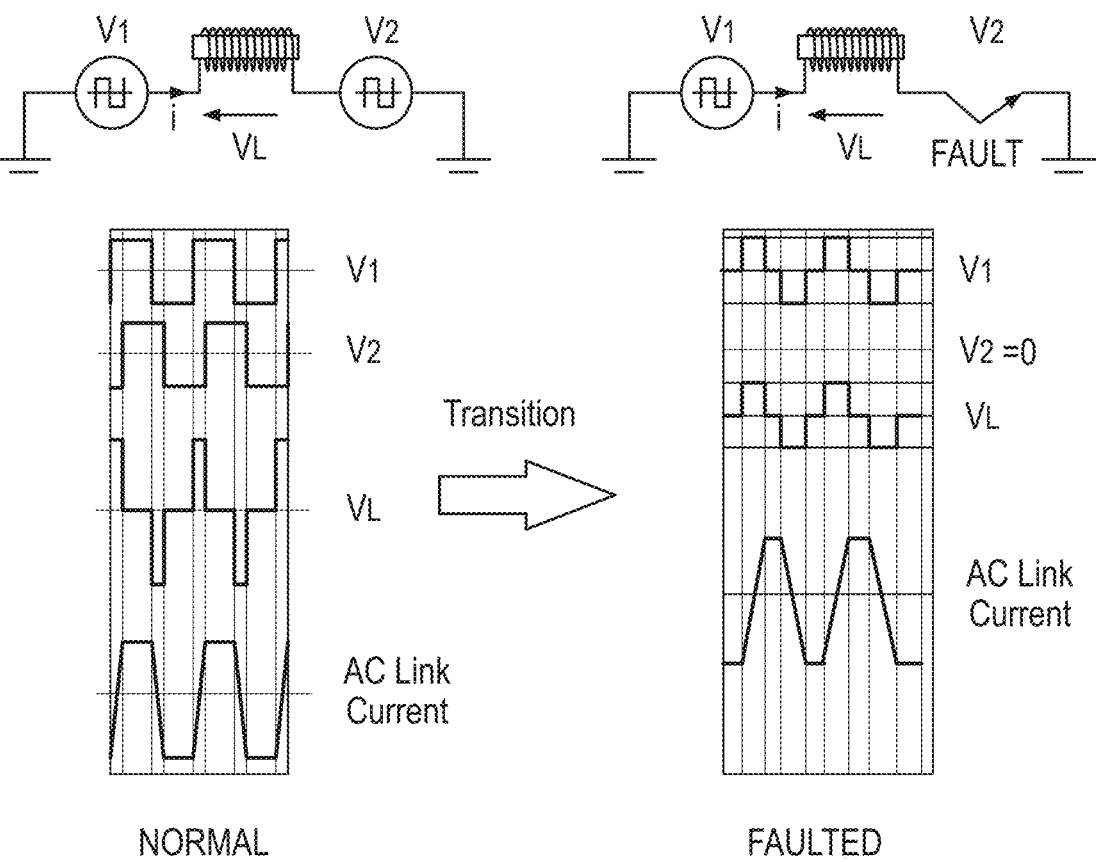
Figure 5B:
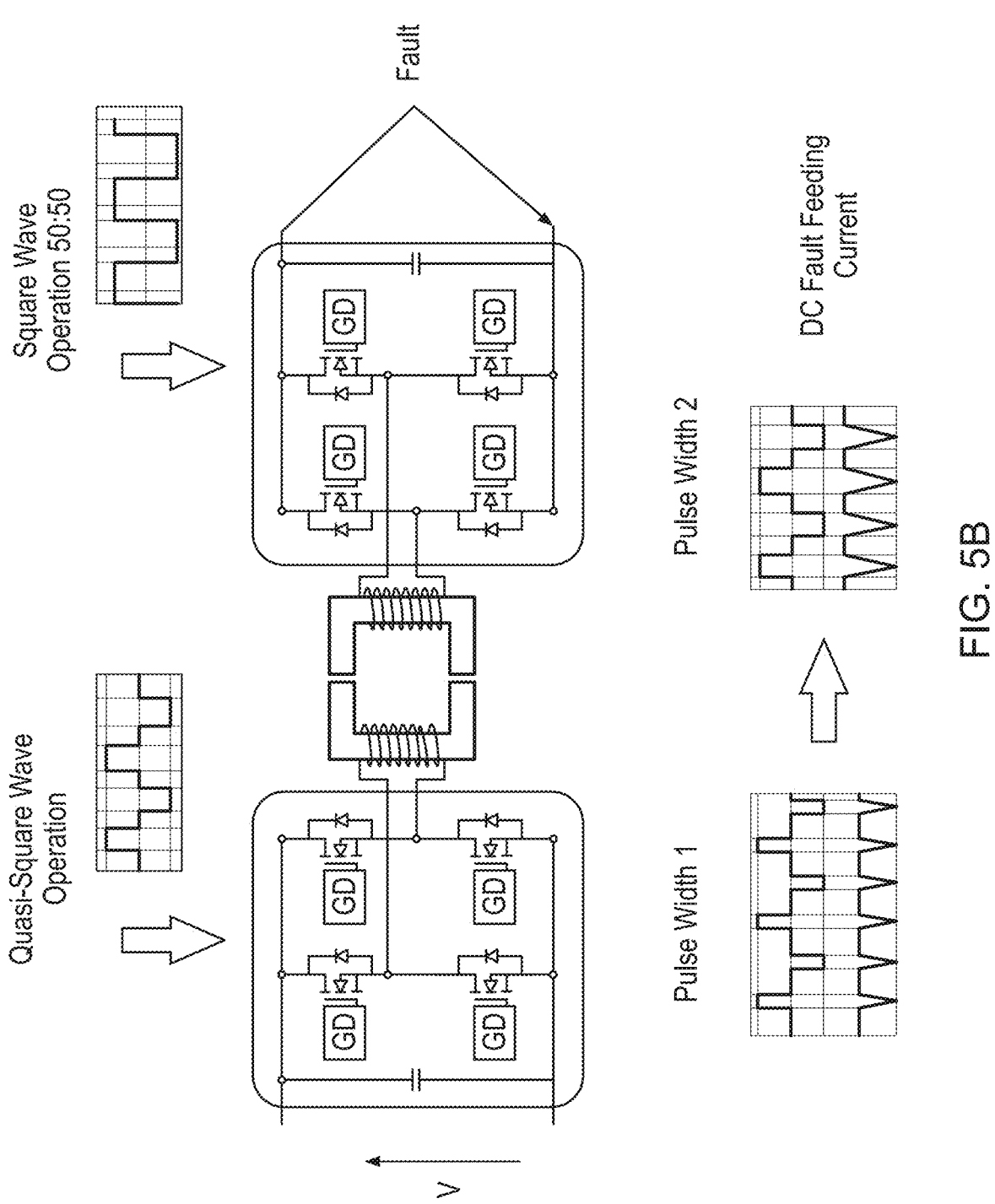
Figure 6:
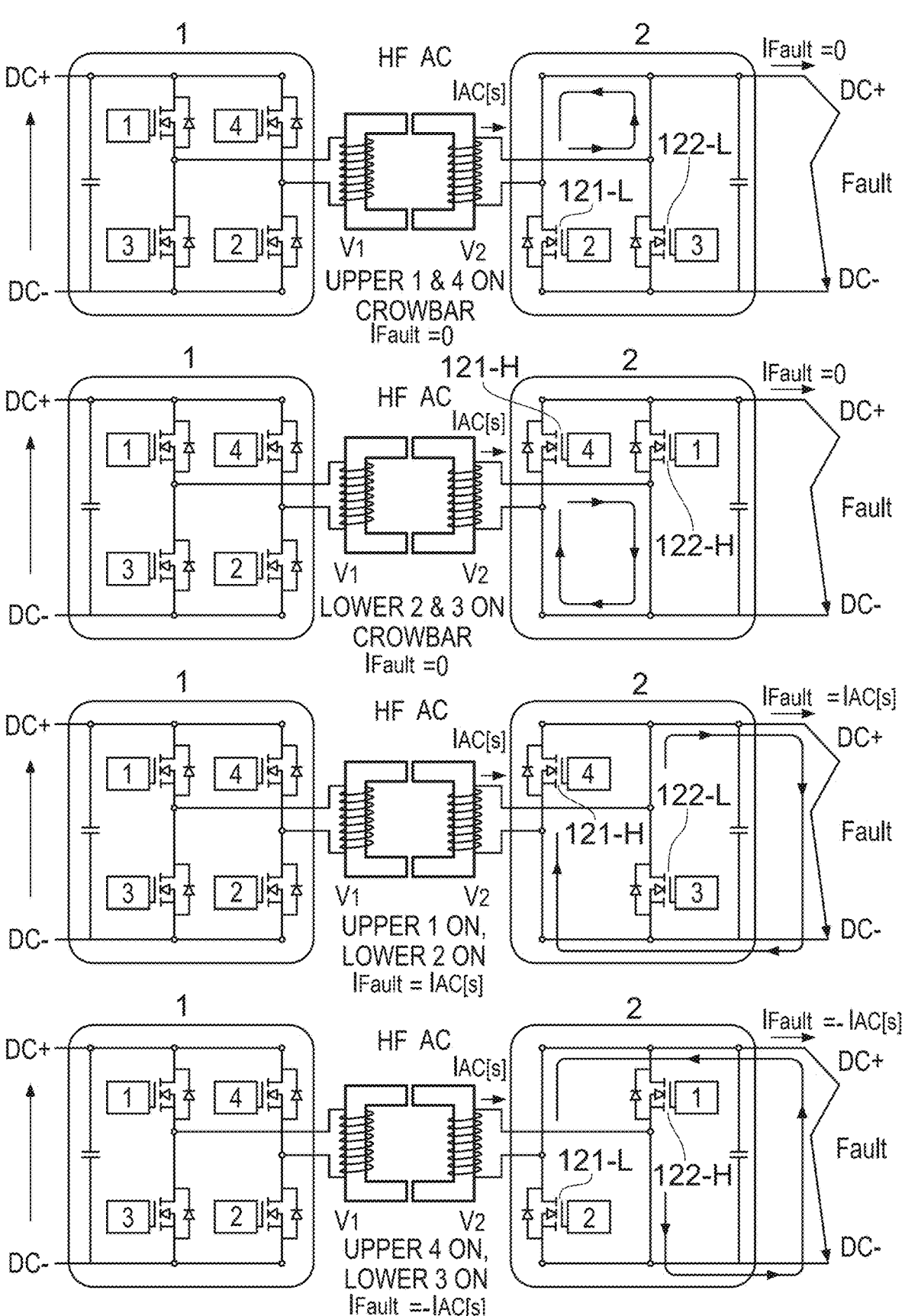
Figure 7A:
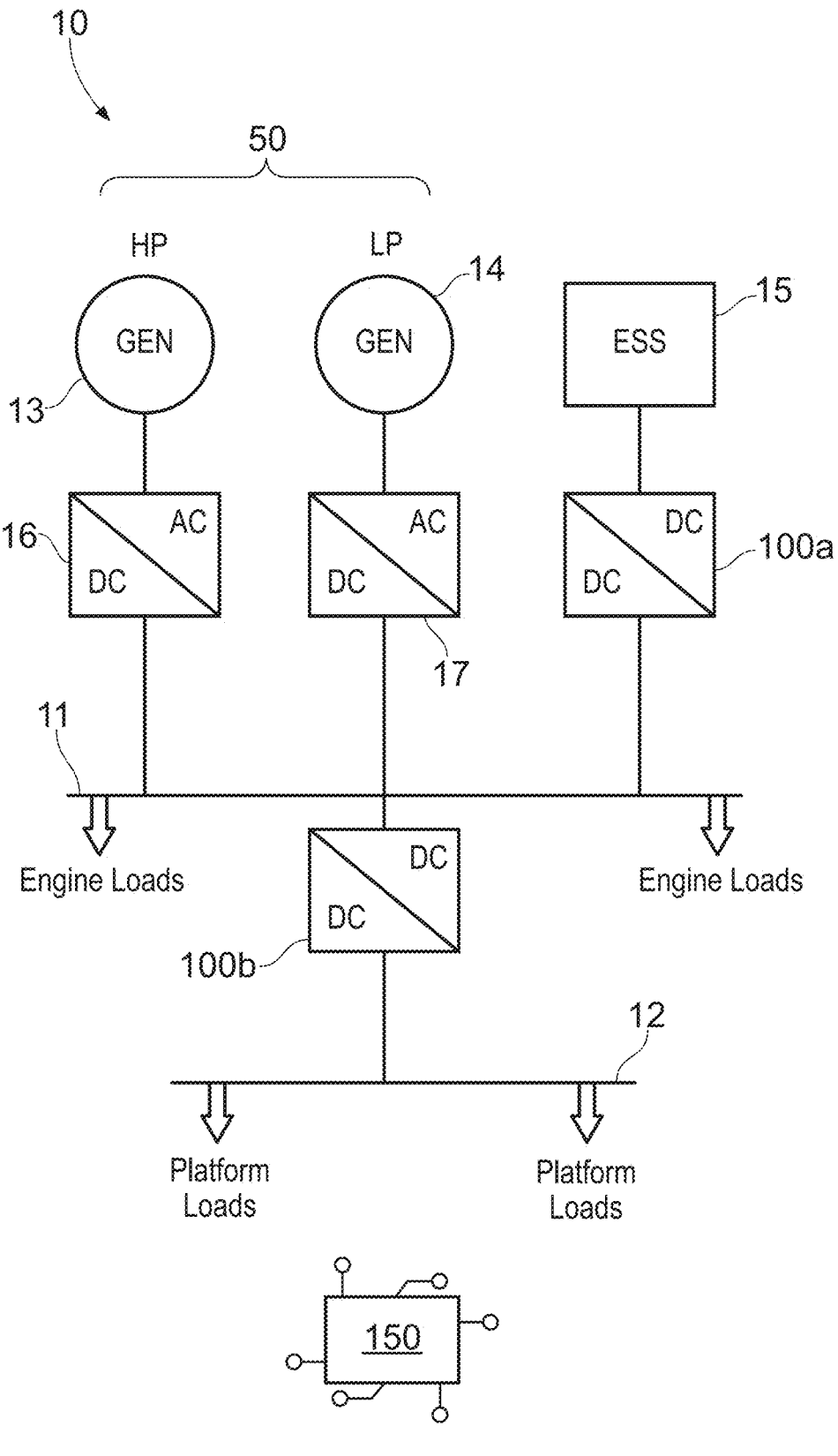
Figure 7B:
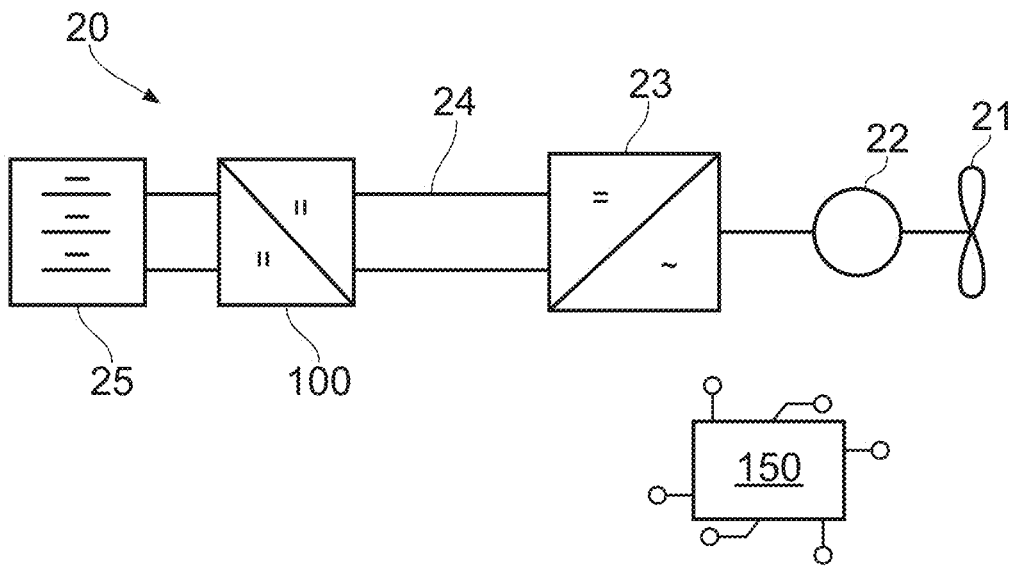
Figure 7C:
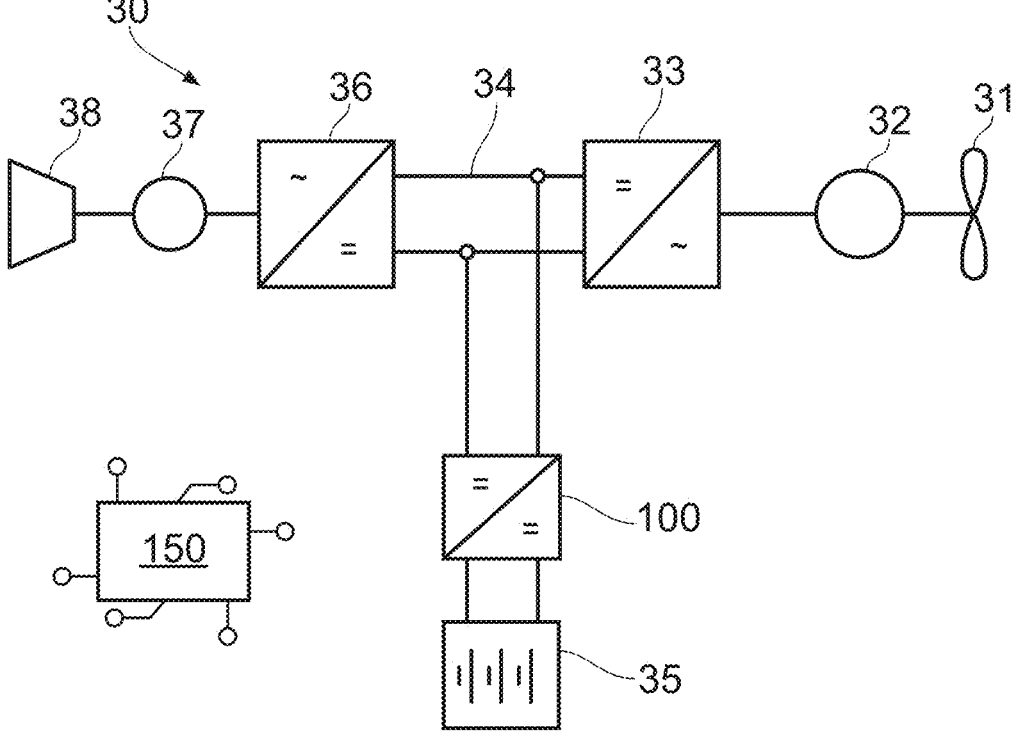
Figure 8A:
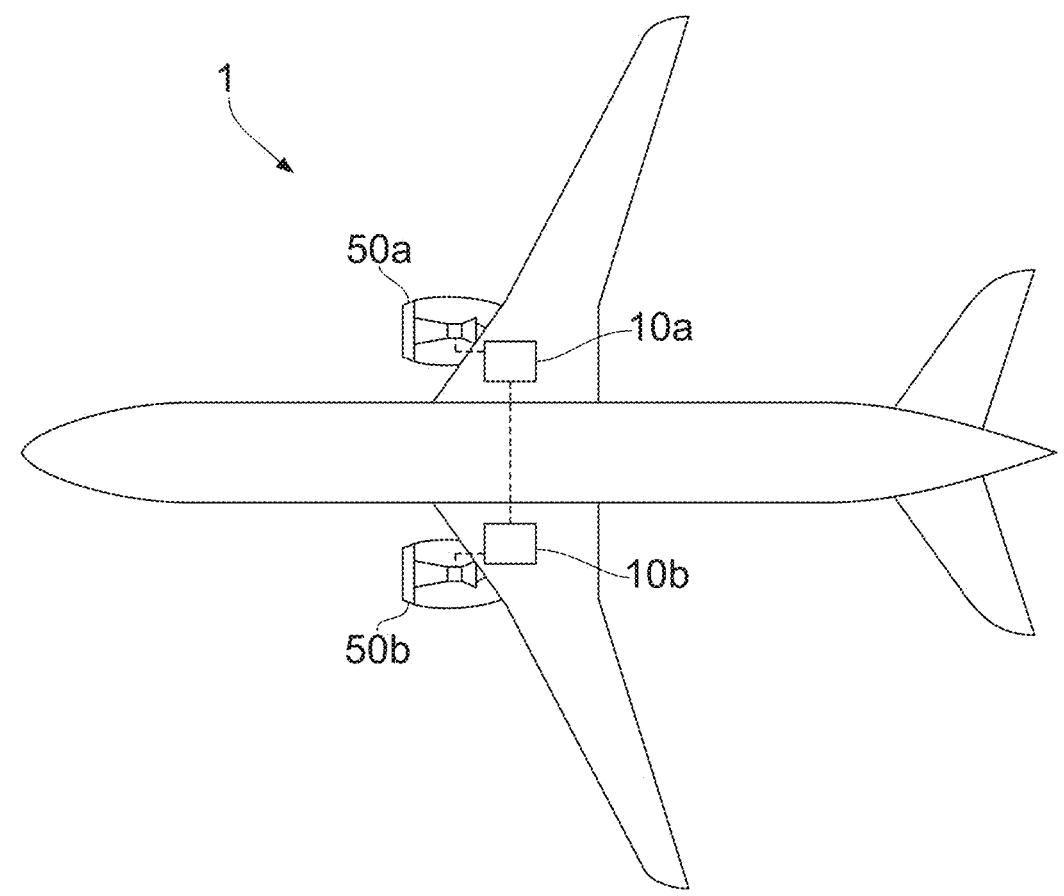

FIG. 4A illustrates a first fault response for the resonant LLC mode of the DC:DC converter;

FIG. 4B illustrates a second fault response for the resonant LLC mode of the DC:DC converter;

FIG. 4C illustrates a third fault response for the resonant LLC mode of the DC:DC converter;

FIG. 5A illustrates a first fault response for the DAB mode of the DC:DC converter;

FIG. 5B illustrates a second fault response for the DAB mode of the DC:DC converter;

FIG. 6 illustrates a third fault response for the DAB mode of the DC:DC converter, using crowbar and fault-feeding rectifier configurations;

FIG. 7A is a schematic diagram of an aircraft power and propulsion system that includes DC:DC converters;

FIG. 7B is a schematic illustration of an electric aircraft propulsion system;

FIG. 7C is a schematic illustration of a hybrid electric aircraft propulsion system;

FIG. 8A is a plan view of an aircraft; and

Figure 8B:
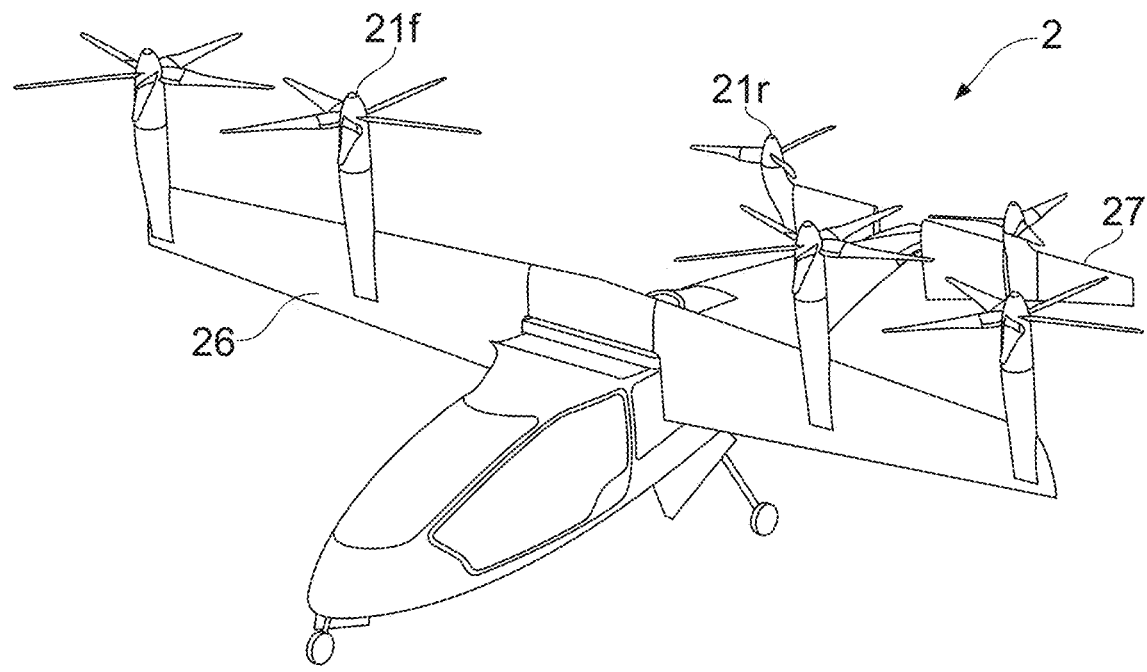
Figure 9:
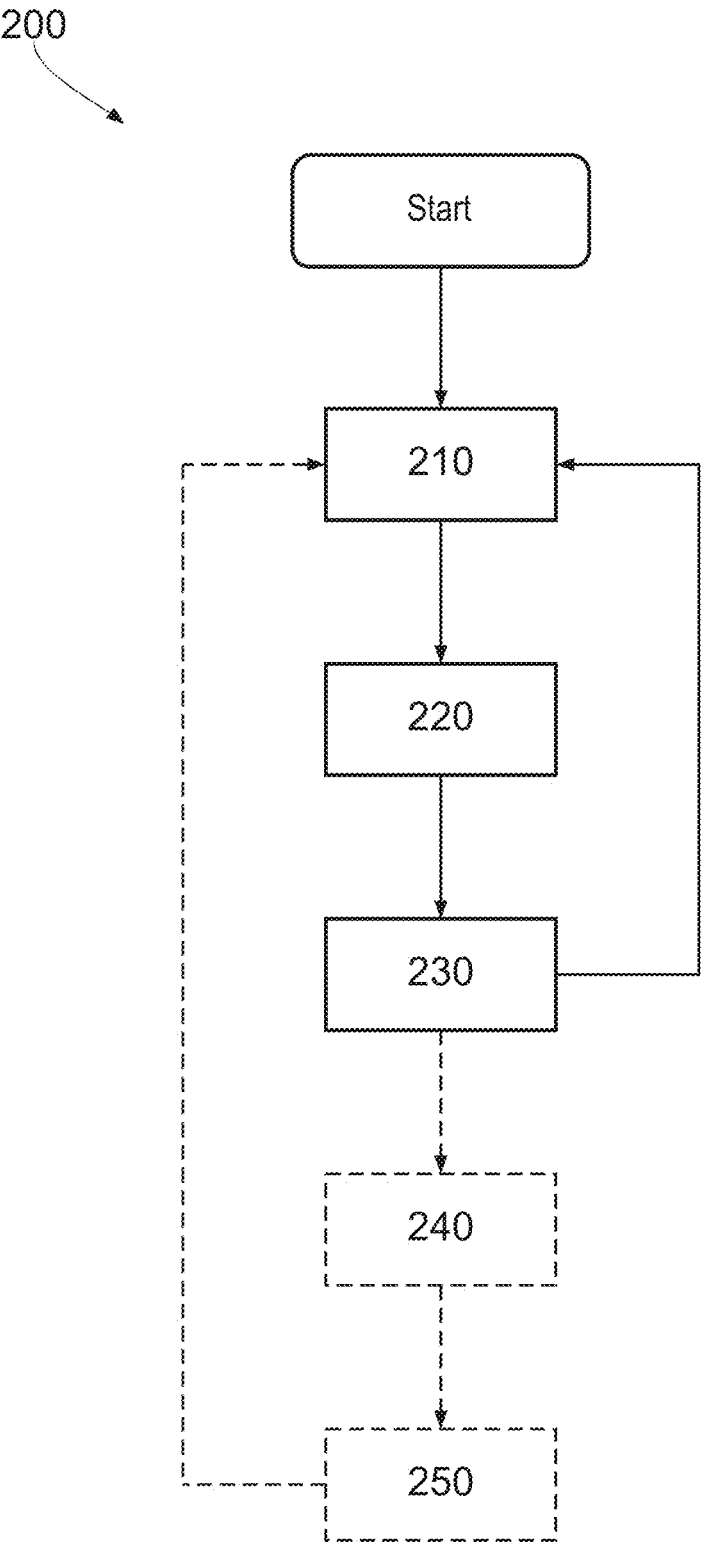

FIG. 8B is a perspective view of a vertical take-off and landing (VTOL) aircraft; and FIG. 9 is a flow chart of a method of operating an electrical power system.

DETAILED DESCRIPTION

Figure 1A:
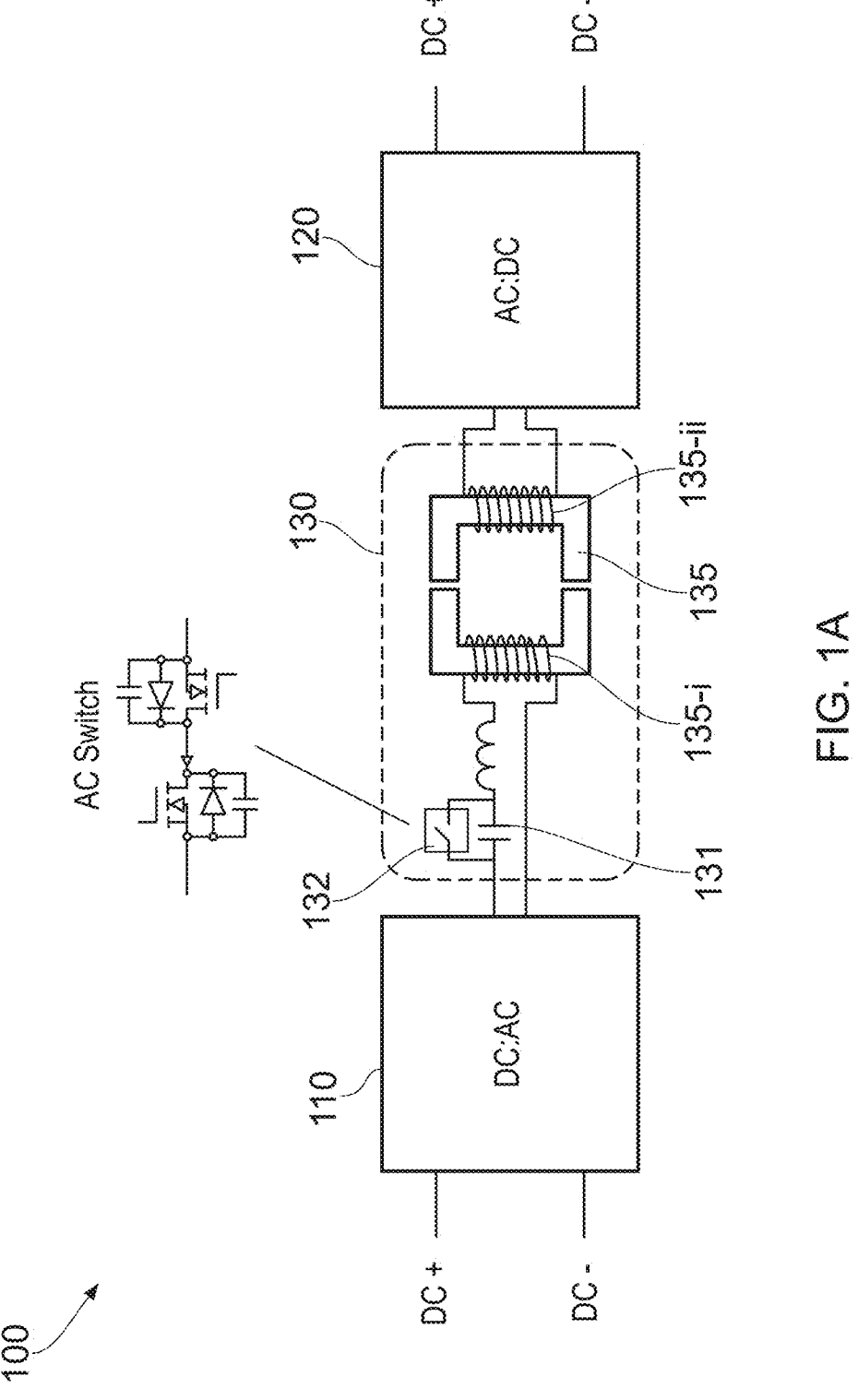
FIG. 1A is a schematic illustration of a DC:DC converter.

FIG. 1A illustrates a reconfigurable DC:DC converter 100 in accordance with the present disclosure. The DC:DC converter 100 may be used in an electrical power system, for example as any one of the DC:DC converters 100, 100a, 100b shown in the electrical power systems 10, 20, 30 of FIGS. 7A-7C, described in more detail below.

The reconfigurable DC:DC converter 100 is a DC:AC:DC converter that includes, back-to-back, a DC:AC converter circuit 110 and an AC:DC converter circuit 120. The AC sides of the two converter circuits 110, 120 are connected by an AC link 130 that includes a transformer 135. The transformer has a first winding 135-i connected to the AC side of the DC:AC converter circuit 110 and a second winding 135-ii connected to the AC side of the AC:DC converter circuit 120.

Figure 1B:
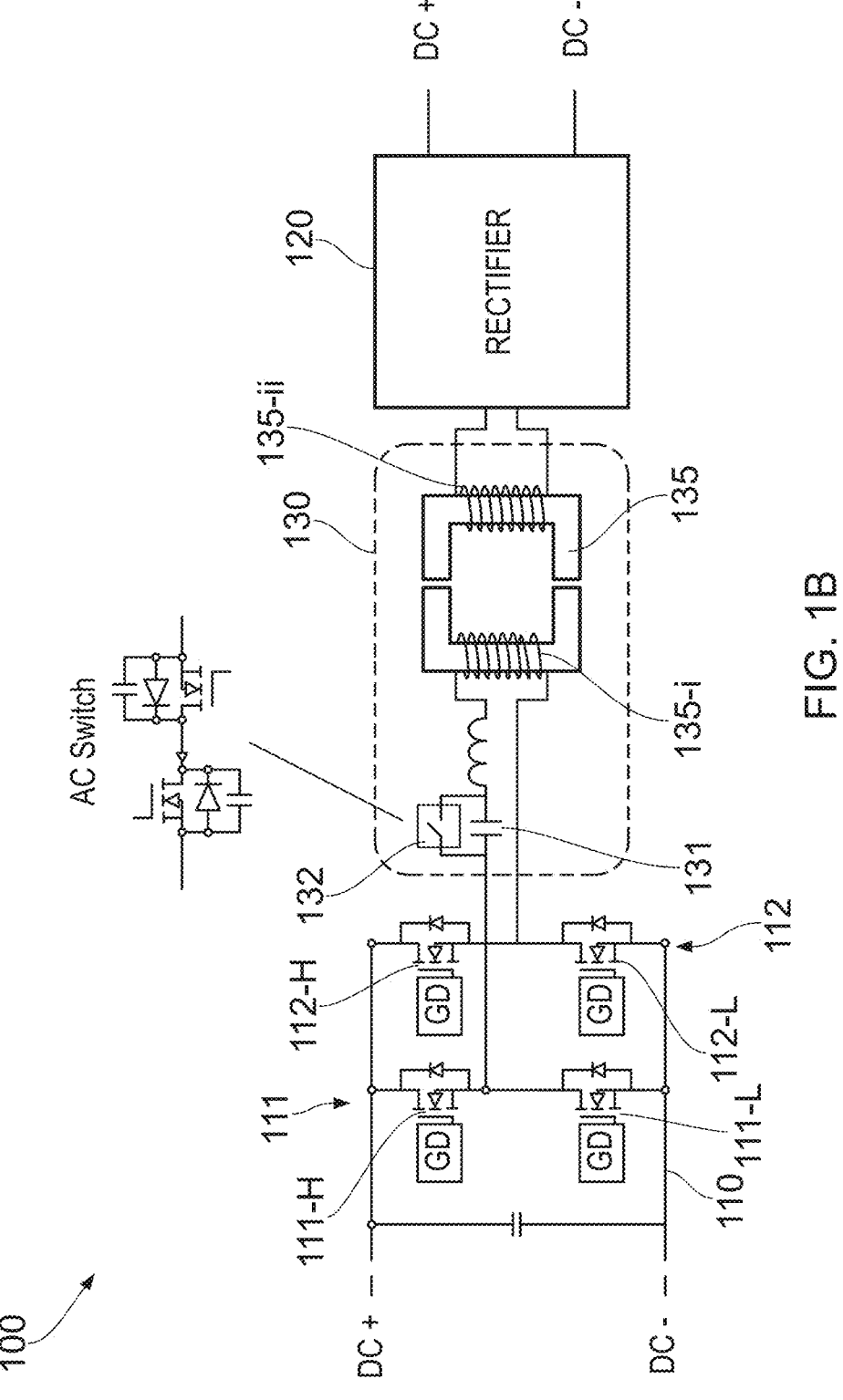
FIG. 1B illustrates an example converter circuit structure which may be used in the DC:DC converter of FIG. 1A.

Each of the DC:AC converter circuit 110 and the AC:DC converter circuit 120 can take any form suitable for the desired system functionality, and for this reason no circuit structure is shown in FIG. 1A. An example circuits is, however, shown in FIG. 1B. In FIG. 1B, the DC:AC converter circuit 110 takes the form of an H-bridge circuit in which the first winding 135-i of the transformer 135 is connected between the two halves of the H-bridge. The H-bridge circuit 110 includes two DC inputs/rails, DC+ and DC−, with two half-bridge circuits 111, 112 connected therebetween. Each half-bridge (e.g., half-bridge 111) includes high-side and low-side transistors 111-H, 111-L connected in anti-parallel with a diode, which may be a discrete component or a body diode of the respective transistor. The mid-point of each respective half-bridge 111, 112, between the two transistors of the half-bridge, is connected to a respective terminal of the first winding 135-i of the transformer. The AC:DC converter 120 could take the same or a different form, for example the AC:DC converter 120 could instead be a passive diode rectifier.

In use, DC power is supplied to the DC terminals of the DC:AC converter circuit 110. Gate driver circuits (GD), under the control a control system, supply switching signals to the transistors of the two half-bridges of the DC:AC converter 110 with a switching pattern appropriate for inverting the DC to AC. The AC signal is supplied to the first winding 135-i, which induces a voltage in a second winding 135-ii. The resulting AC signal is rectified by the second DC:AC converter circuit 120. The magnitude of the DC voltage at the output of the second DC:AC circuit 120 will depend on the input voltage, the turns ratio between the first and second transformer windings 135-i, 135-ii and the frequency and duty cycle of the PWM switching signals.

Although an H-bridge circuit 110 is shown, it should be understood that other circuits are possible and within the scope of the present disclosure. For example, other DC:AC converter which may be suitable include:

Passive circuits (e.g., the AC:DC circuit 120 may be a diode rectifier).

3-phase, 2-level converter circuits, each having six power semiconductor switches. In this case, a 3-phase transformer and three resonant capacitors may be used in the AC link.

3-level neutral point clamped converter circuits.

T-type converter circuits.

Modular Multi-level Converter (MMC) circuits.

Returning to FIG. 1A, the converter 100 further includes a capacitor 131 and a switch arrangement 132 which has first and second switch states. In the first state of the switch arrangement 132, the capacitor 131 is connected in series between the AC side of the DC:AC converter circuit 110 and the first winding 135-i of the transformer. In the second state of the switch arrangement 132, there is a bypass path around the capacitor 131 so that the AC side of the DC:AC converter circuit 110 is connected directly to the first winding 135-i of the transformer 135.

In the depicted example, the switch arrangement 132 takes the form an AC switch connected in parallel with the capacitor 131. In its open state (i.e., the first state), the bypass switch 132 experiences both the positive and negative alternating voltage developed across the capacitor 131. In its closed state (i.e., the second state), the switch conducts an alternating current present in the AC link 130. The AC switch 132 may be a mechanical AC switch, for example an AC contactor. Alternatively, a semiconductor switch, for example a pair of reverse-series transistors may be used. Switches and switch arrangements of types other than a parallel-connected switch are contemplated and will occur to persons skilled in the art.

In the first switch state, the AC link 130 of the DC:DC converter 100 has series-connected capacitance (provided by the capacitor 131) and inductance (provided by the transformer 135 and indicated by the inductor circuit symbol). As a result, in the first switch state the converter 100 behaves as a so-called resonant LLC converter, with an impedance that has a minimum value at a resonant frequency, $F_0$. This is depicted in the left-hand graph of FIG. 1C. The value of the resonant frequency is given by:

$$F_0 = \frac{1}{2\pi\sqrt{L_r C_r}}$$

In this equation, $C_r$ is the capacitance of the capacitor 131 and $L_r$ is the inductance of the transformer 135. $L_r$ includes both the series contribution ("leakage inductance") and the parallel contribution ("magnetizing inductance") of the transformer 135, with the leakage inductance usually dominating the value of $L_r$.

In the second state, the AC link 130 of the DC:DC converter 100 has substantially zero capacitance, i.e., it is purely inductive. The relationship between frequency and impedance is therefore linear, as shown in the right-hand graph of FIG. 1C. There is no resonant behavior and the DC:DC converter behaves as, for example, a Dual Active Bridge (DAB) DC:DC converter (assuming the DC:AC and AC:DC converter circuits 110, 120 are active bridge circuits).

Figure 1C:
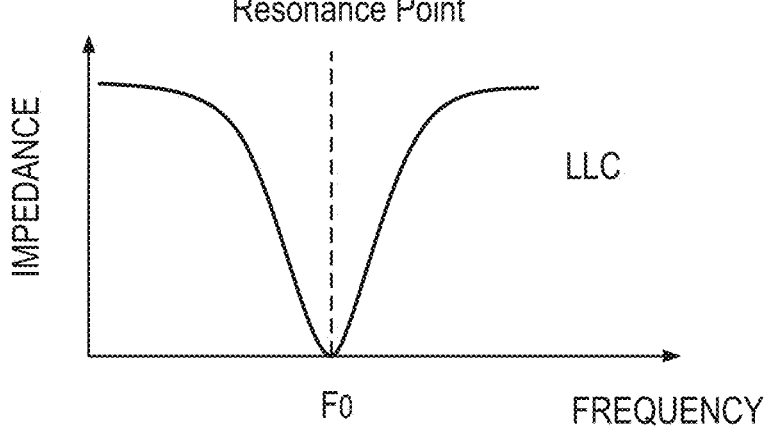
FIG. 1C shows how the impedance of the AC link of the DC:DC converter changes with frequency in the resonant LLC mode and the DAB mode of the DC:DC converter.
Figure 1C:
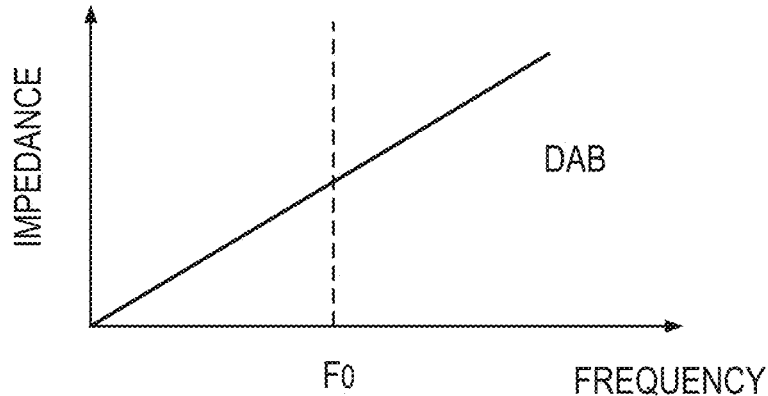

The ability to reconfigure the DC:DC converter 100 between a resonant LLC topology and a, e.g., DAB topology means that a system can have the benefits of both topologies while some of the problems associated with the topologies can be avoided. For example:

As shown in FIG. 1C, the resonant LLC converter (first switch state) has an extremely low impedance when operated at or near the resonant frequency of the AC link 130. If operated at or close to this frequency, the current flowing through the AC link 130 and presented to the AC:DC converter circuit 120 is highly sinusoidal with minimal harmonic content. The result is less heating in the transformer and reduced switching losses. Through suitable selection of the capacitor and transformer, the resonant frequency can correspond to the preferred operating point an electrical power system comprising the DC:DC converter 100. Thus, the highly efficient LLC converter topology can be the 'normal' configuration of the DC:DC converter 100. This may be particularly desirable where the input and output voltages of the DC:DC converter 100 are largely fixed (e.g., 540 $V_{DC}$ and 270 $V_{DC}$), as the voltage change can be controlled mainly by the transformer turns ratio. In other words, if in normal operation there is little or no need to make any significant change to the operating frequency, the converter can spend almost all its time operating efficiently in the resonant LLC mode.

In the event of a fault (e.g., a short circuit) in a DC network connected to the AC:DC converter circuit 120, it may be desirable to control the converter 100 to feed a controlled amount of fault current to the fault site, for example to operate downstream protection to isolate the fault. This may necessitate operation at a frequency away from the resonant frequency of the LLC converter (e.g., a higher frequency). Switching from the first switch state (resonant LLC converter) to the second switch state (e.g., DAB converter) in response to the fault allows this fault response without what could otherwise be a steep rise in the impedance of the AC link 130. The steep rise could lead to sudden transformer heating. In addition, the high impedance of the LLC could impact the control resolution of the converter 100, meaning certain fault responses that are available in the DAB mode may not be available in the LLC mode.

In electrical power systems in which the output power and voltage needs to change over a relatively wide range to meet requirements (e.g., where the load is a passive resistive heater), the ability to switch between the resonant LLC converter and, e.g., DAB converter may be useful. This is because the change in output power would involve a change in frequency. The second state (e.g., DAB converter mode) may be used to allow control of the power within some or even most of the range (e.g., a relatively low power/voltage range) whereas the first state (resonant LLC converter) can be reserved for high power operation tuned to the resonant frequency where losses would be highest in the second state.

Additionally, in both the first and second switch states, the reconfigurable DC:DC converter 100 has the following benefits:

Galvanic isolation: The intermediate transformer 135 provides a physical electrical break between the two sides of the DC:DC converter (e.g., between the engine and platform electrical networks). This means high frequency common mode currents created by semiconductor switching, which are capacitively couped to the ground/chassis, are prevented from propagating as the return path is interrupted.

Grounding: The isolation provides the option to apply different grounding points. For example, an engine system could operate at +/−270 $V_{DC}$ with respect to ground with the platform system operating at 0, +270 $V_{DC}$.

Prevention of Ground Loops: Ground loops can occur in non-isolated power supplies when there are multiple paths for current to flow between the two circuits, which can lead to EMI issues-especially conducted emissions.

Reduction of capacitive coupling: Capacitive coupling refers to the transfer of energy between the circuits through an electric field. This can occur between input and output circuits if they are in close proximity of a converter. The physical barrier provided by the isolated topology prevents or reduces this phenomenon.

Prevention of galvanic coupling: Galvanic coupling refers to the transfer of energy between the circuits through a direct electrical connection. This can occur in non-isolated topologies through a shared ground. The physical barrier of the isolated DAB converted topology removes the shared ground which in turn prevents galvanic coupling.

Figure 2:
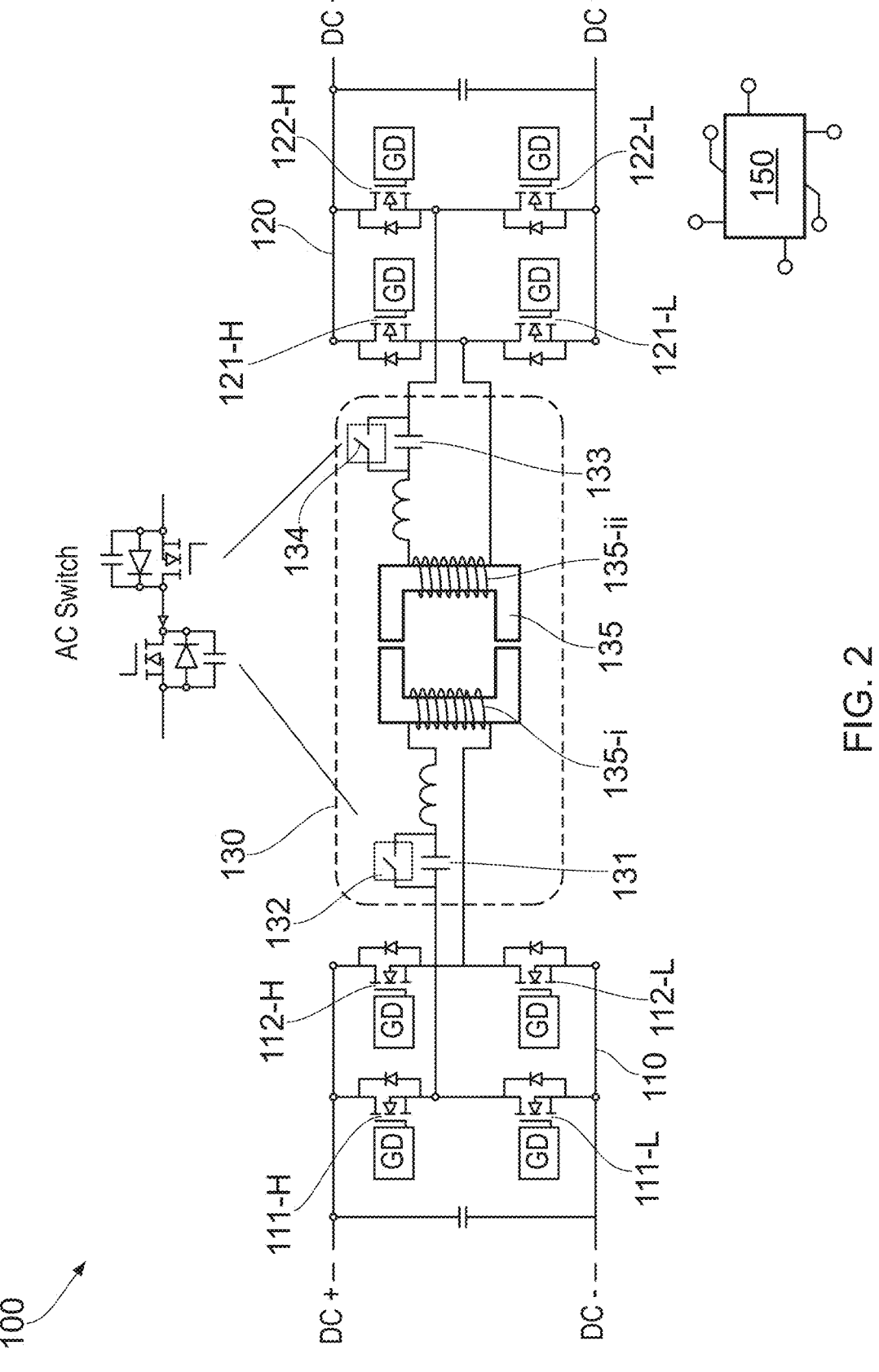
FIG. 2 is a schematic illustration of a bi-directional DC:DC converter.

Turning now to FIG. 2, a bi-directional embodiment of the reconfigurable DC:DC converter 100 is shown. In this embodiment, both sides of the converter 100 are active, i.e., both the DC:AC converter circuit 110 and the AC:DC converter circuit 120 are active circuits. As before, while H-bridge circuits are shown, this is only an example and other types of converter circuits could be used instead.

The bi-directional reconfigurable DC:DC converter 100 further includes a second capacitor 133 and a second switch arrangement 134. The second switch arrangement 134 can take the same form as the first switch 132 and has a similar function. In a first state of the second switch arrangement 134, the capacitor 133 is connected in series between the AC side of the AC:DC converter circuit 120 and the second winding 135-*ii* of the transformer 135. In a second state of the second switch arrangement 134, the switch provides a bypass path around the capacitor 133 so that the AC side of the AC:DC converter circuit 120 is connected directly to the second winding 135-*ii* of the transformer 135.

FIG. 2 also shows a control system 150, which may form part of the converter 100 or may be part of a wider electrical power system. The control system 150 controls the state of the switch arrangement(s) 132, 134 and may further control the switching operation of the power semiconductors of the converter circuits 110, 120.

Figure 3A:
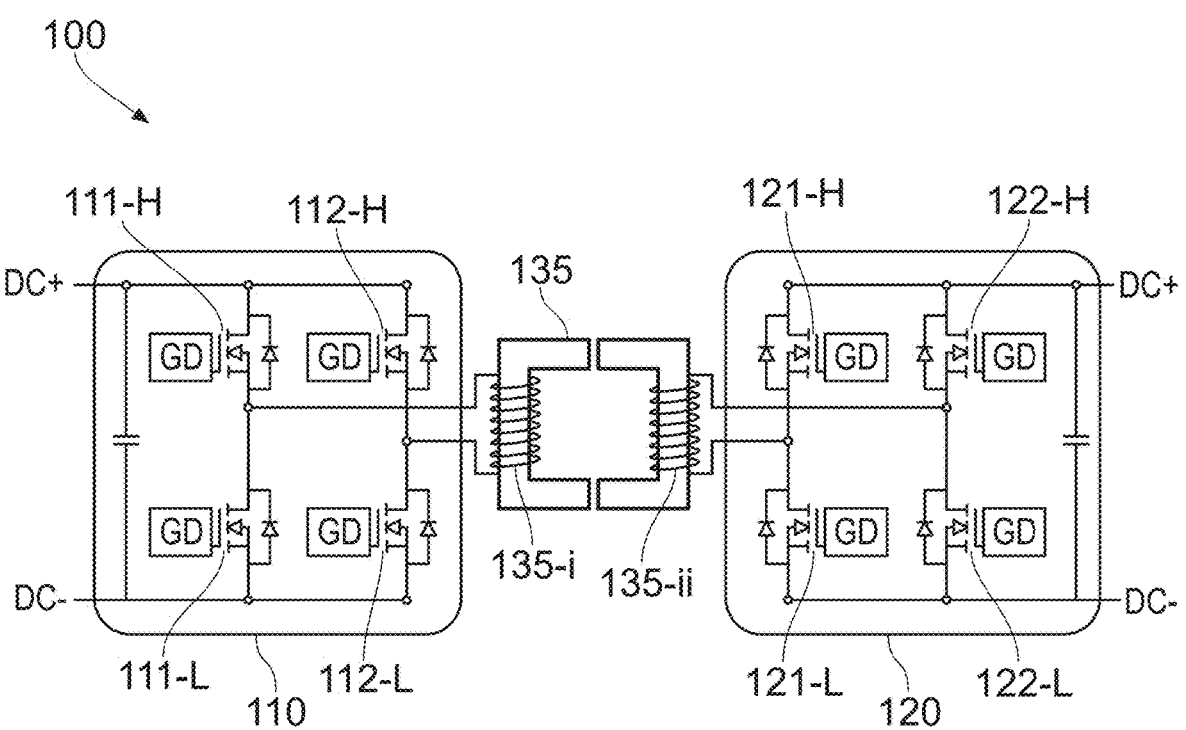
FIG. 3A illustrates the principle of operation of a DAB DC:DC converter.
Figure 3A:
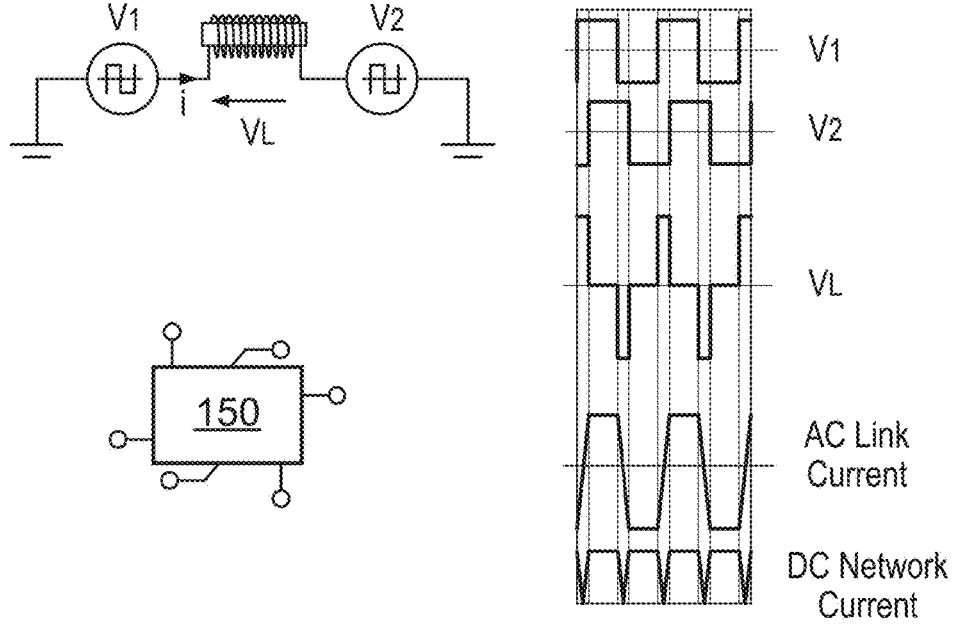
Figure 3B:
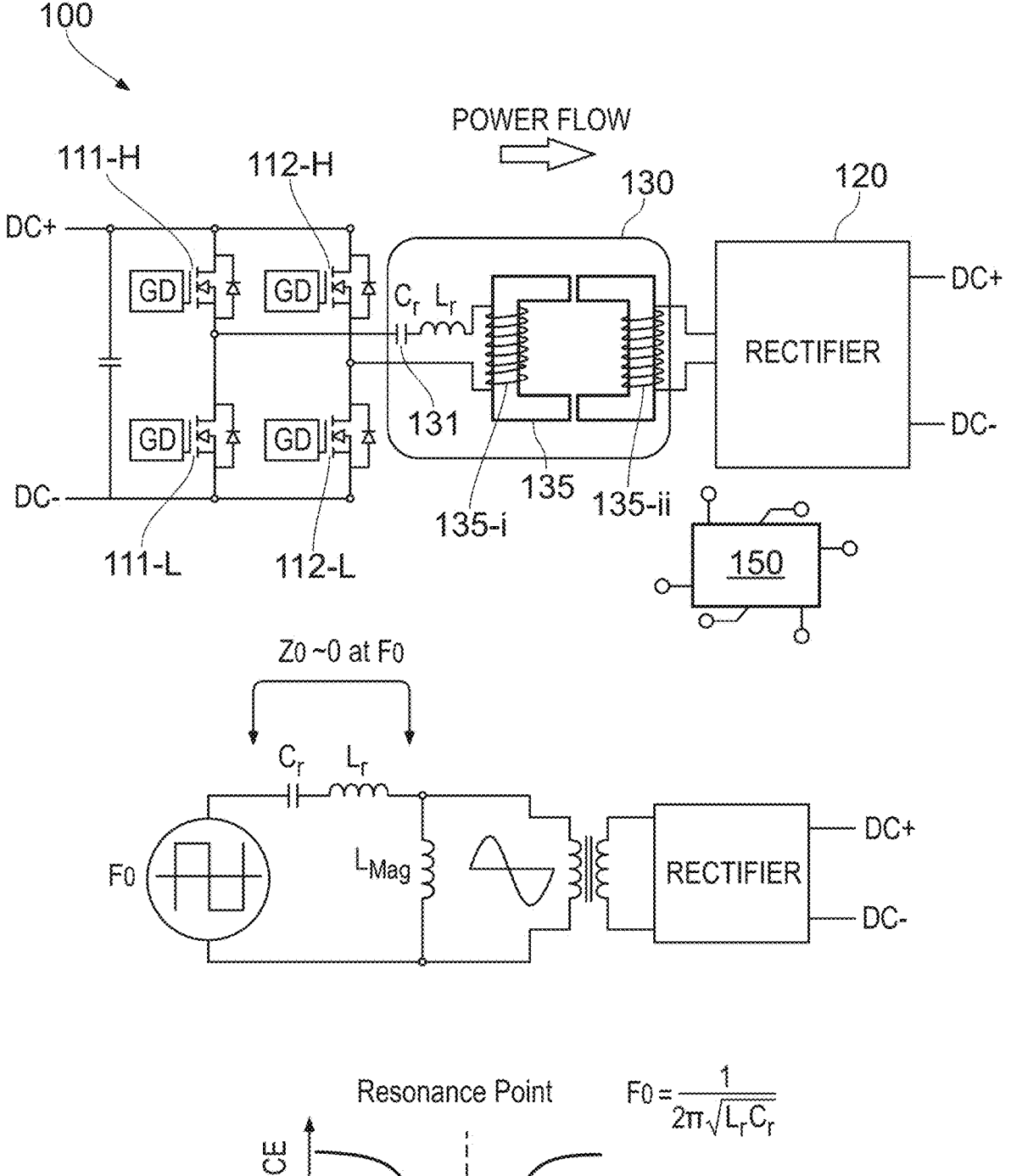
FIG. 3B illustrates the principle of operation of a resonant LLC converter.

FIG. 3A and FIG. 3B explain the operation of the reconfigurable DC:DC converter 100 in more detail. FIG. 3A shows operation in the DAB converter mode (second state) and FIG. 3B shows operation of in the resonant LLC mode (first state).

Referring to FIG. 3A, the top-most drawing shows the DAB converter configuration, with no capacitor connected in the AC link 130. Underneath, there is an equivalent circuit representation of the DAB converter, and graphs showing the voltage and current waveforms during basic operation of the DAB converter. In the basic operation, two 50:50 duty cycle square wave voltages, $V_1$ and $V_2$ are applied to the transformer 135, one from the DC:AC circuit 110 and one from the AC:DC circuit 120. By applying a suitable phase shift between the two voltage waveforms, an alternating 'quasi-square" voltage, $V_L$, is applied to the leakage reactance of the transformer which controls the current and power transferred by the converter 100. In some instances where the transformer leakage reactance is insufficient, the transformer may be modified to include a shim to increase its inductance, or an additional discrete inductor is connected in series with the transformer on one side or both sides.

Although the DAB converter mode has a number of benefits, described in more detail below, the graphs of FIG. 3A show how the transistors of both the H-bridge converters 110, 120 switch on and off at high current and at the full DC voltage. This can cause significant switching losses which impact on efficiency and the generation of high levels of EMI, which may require filtering. In addition, the current flowing in the AC link transformer is trapezoidal rather than sinusoidal in shape, thus containing a high harmonic content. The harmonic currents in the AC link are undesirable as they create additional heating in the transformer and associated wiring which negatively impacts both the component design and efficiency.

FIG. 3B shows the basic operation of the DC:DC converter 100 in the resonant LLC mode, in which the capacitor 131 is connected in series with the leakage reactance of transformer 135. The top-most drawing of FIG. 3B shows the resonant LLC topology. The middle drawing of FIG. 3B shows an equivalent circuit. The bottom-most drawing illustrates the behavior of the AC link impedance, which is very low at a particular tuned resonant frequency, $F_0$.

In use, the H-bridge converter circuit 110 switches to produce a 50:50 duty square wave voltage waveform at or close to the resonant frequency, $F_0$. The square wave voltage contains a predominant fundamental frequency component $V_1$ but also contains odd-order harmonic voltage components $V_3$, $V_5$, $V_7$ etc. that reduce in magnitude following a $1/n$ spectrum (i.e., $\frac{1}{3}$ $V_3$, $\frac{1}{5}$ $V_5$ etc.). From the impedance characteristic shown in FIG. 1C, the AC link presents very little impedance to the fundamental frequency component $V_1$. $V_1$ is therefore passed to the transformer windings and appears as a sinusoidal voltage. In contrast, the impedance characteristic shows a rapid increase in impedance as the frequency increases, meaning the AC link presents a high impedance to the $V_3$, $V_5$, $V_7$ (etc.) harmonic components. Therefore, the harmonic voltages do not appear in the voltage passed to the transformer terminals. For example, the converter may be designed so that the H-bridge switching frequency and AC link frequency operate at a high frequency of 100 kHz to reduce the size of the transformer and series capacitor, with the $3^{rd}$ and $5^{th}$ harmonic voltages at 300 kHz and 500 kHz not appearing at the transformer.

Furthermore, the sinusoidal current flowing from the H-bridge is nominally in phase with the square wave voltage, meaning the transistors switch at near to zero current giving soft switching, low losses, and reduced EMI. The sinusoidal voltage and current waveforms at the second winding 135-*ii* of the transformer 135 also offer soft-switching opportunities to the rectifier converter circuit 120. A full-wave H-bridge diode rectifier would commutate diodes at both zero voltage and zero current (i.e., soft voltage and soft current switching), again giving efficiency and EMI benefits. Similar performance can be achieved using an active transistor-based rectifier circuit 120.

From the above, the benefits of the resonant LLC configuration can be appreciated, at least where operation at or close the resonant frequency is possible. However, as mentioned previously, operation of the converter 100 where there is a DC network fault at one side of the converter should also be considered. FIGS. 4A-4C illustrate three fault response modes which may be used in the resonant LLC configuration.

FIG. 4A illustrates a first type of fault response in which the transistors of the DC:AC converter circuit 110 are turned off. This extinguishes the fault current that would be supplied to the faulted DC network. While this approach is useful in some scenarios, it may not be preferred in all cases. For example, with zero current supplied to the faulted DC network, it may not be possible to activate protection systems, such as DC contactors, in the faulted network to isolate the fault so that the remaining, non-faulted, parts of the network can return to normal operation.

FIG. 4B illustrates a second type of fault response in which a non-zero, controlled amount of fault current can be fed to the faulted DC network. Here, the current is controlled by increasing the impedance of the series L-C branch (i.e., the AC link 130) of the resonant LLC converter such that the fundamental and harmonic components of voltage present in the square-wave voltage drive the desired current magnitude for discrimination and isolation. Referring again to FIG. 1C, this can be achieved by changing the switching frequency of the DC:AC converter circuit 110. While in principle the impedance can be increased by decreasing or increasing the frequency, it may be preferable to increase the switching frequency so that the impedance is dominated by the inductive reactance (i.e., inductive region) rather than by reducing the frequency and temporarily operating in the capacitive region.

FIG. 4C illustrates a third type of fault response in which a non-zero, controlled amount of fault current can be fed to the faulted DC network. In the third type of fault response, the switching pattern applied to the transistors of the DC:AC converter circuit 110 is changed so that zero voltage notches are introduced into the waveform. For example, for the illustrated H-bridge circuit 110, a zero-voltage notch is produced when the two upper or two lower transistors of the H-bridge converter are turned on together. The effect is to reduce the fundamental and harmonic components of voltage generated by the DC:AC converter circuit 110 and fed to the AC link 130.

The second and third types of fault response shown in FIGS. 4B and 4C may be used alone or in combination with each other. It is envisaged that the second type of response, i.e., increasing the impedance of the AC link 130 by changing (e.g., increasing) the switching frequency would be the primary means of controlling the current fed to a fault. The voltage control provided by the third type of control could offer a means of additional support where needed. For example, if in normal operation the transistors are already close to their predefined maximum operating frequency, the increase in frequency required to affect the second type of control might be impractical. This may the need support of a simultaneous reduction in the driving voltage, which may be achieved by reducing the voltage at DC side of the DC:AC converter circuit 110, subject to the attached loads being tolerant of this temporary reduction in their supply voltage.

While the fault response modes described above provide a degree of fault current control, in practice the resonant LLC configuration is much more effective where the operating point is stable. This is in part due to the large change in impedance with changing frequency when operating away from the resonant point, which makes accurate control and the maintenance of a stable operating point away from the resonance challenging, particularly when responding to faults. In accordance with some aspects of the present disclosure, the reconfigurable DC:DC converter 100 is switched from the first state to the second state when a fault in a DC network connected to one DC-side of the converter 100 is detected. In the second state (e.g., the DAB converter configuration), the fault current control may be considerably better. FIGS. 5A-5B and FIG. 6 illustrate additional fault responses which may be utilized in the second state of the switch arrangement 132, 134 the DC:DC converter 100 in response to a fault in a DC network connected at one side of the converter 100.

Referring to the left-hand side of FIG. 5A, this shows normal operation of the DC:DC converter in the second switch state (DAB converter configuration), which has been described above with reference to FIG. 3A. The right-hand side of FIG. 5A illustrates a first type of response to conditions when a DC fault occurs, causing $V_2$ to become zero or near-zero. Here, the transformer 135 is required to support the whole of the alternating voltage, $V_1$, produced by the healthy DC:AC converter circuit 110. In order to control the AC link current, the volt-time area applied to the transformer leakage inductance is reduced by introducing zero portions into the alternating voltage waveform (i.e., modifying the voltage waveform $V_1$ from a square wave to a quasi-square wave). This can be achieved by switching on the two upper (high-side), or two lower (low-side) transistors, of the H-bridge 110. By changing the converter switching pattern in this way, the AC link current is controlled and offers a convenient way of varying the magnitude of the AC link current.

FIG. 5B illustrates a second type of fault response. Here, following the fault, the switching operation of the transistors 111-L, 111-H, 112-L, 112-H of the healthy DC:AC converter circuit 110 is modified so that the pulse width of the voltage waveform $V_1$ changes. As before, this modifies the AC link current and therefore the amount of fault current supplied to the faulted DC network. Therefore, by controlling the pulse width of the voltage $V_1$ applied by the healthy DC:AC converter circuit 110, the amount of fault current is controlled.

It can also be seen from FIG. 5B that the first and second types of fault current control may be used in combination. In other words, as well as introducing zero portions into the alternating voltage waveform, $V_1$, as in FIG. 5A, the pulse width can be changed and the AC:DC converter circuit allowed to transfer a fully rectified version of the transformer current to the DC fault.

It is noted that while the fault current extinguishing state, equivalent to that shown in FIG. 4A for the resonant LLC configuration, is not shown for the DAB configuration, this state can also be used in the second switching state of the reconfigurable converter.

FIG. 6 shows a third type of fault response which may be used in the second switch state of the reconfigurable DC:DC converter 100. According to this approach, the switching state of the transistors 121-L, 121-H, 122-L, 122-H of the AC:DC converter circuit 120 connected to the faulted DC network are controlled to repeatedly switch the converter 100 between a crowbar configuration and a fault feeding configuration.

In the fault-feeding configuration, two versions of which are shown in the lower two circuits of FIG. 6, the current that passes the AC link 130 is transmitted through the AC:DC converter circuit 120 to the faulted DC network. In the case of the illustrated H-bridge circuit 120, this can be achieved by switching on the high-side transistor of one half-bridge and the low-side transistor of the other half-bridge and turning off the other two transistors. Those skilled in the art will appreciate how this can be applied to converter circuits other than H-bridge, for example a two-level, three-phase converter circuit.

In the crowbar state, two versions of which are shown in the upper two circuits of FIG. 6, current is contained within (e.g., circulates within) the converter circuit 120. In the case of the illustrated H-bridge circuit 120, this can be achieved by switching on the high-side transistors of both half-bridges while switching off the low-side transistors of both half-bridges, or vice versa. Again, those skilled in the art will appreciate how this can be applied to converter circuits other than H-bridge. For example, in a two-level, three-phase converter circuit, all three low-side transistors may be switched on and all three high-side transistors switched off, or vice versa.

By repeatedly switching between the fault-feeding mode and the crowbar mode, current is only fed to the fault side some of the time. The time-averaged fault current is therefore lower than the full fault current. The amount of current may be controlled by changing how much of the time the converter 100 spends in the crowbar mode relative to the fault feeding rectifier mode. Additionally, the amount of fault current may be controlled by control the DC:AC converter circuit 100, using the fault response techniques described above with reference to FIGS. 5A and 5B.

While in principle these alternative fault response modes could be accessed using the resonant LLC configuration, in practice they may not be usable due to the rapid change in impedance and resulting drop in control bandwidth that occurs away from the resonant frequency, $F_0$. Therefore, according to some aspects of the present disclosure, a control system 150 may respond to a fault in a DC network connected to the DC:DC converter 100 by switching from the first state to the second state of the switch arrangement 132 and utilizing one or more of the fault response strategies shown in FIGS. 5A-5B and FIG. 6.

As explained above, the reconfigurable DC:DC converter 100 of the present disclosure may appear in an aircraft electrical power system. Exemplary power and propulsion systems are shown in FIGS. 7A-7C.

FIG. 7A illustrates an electrical power system 10 of an aircraft. The electrical power system 10 includes two DC networks: a first, higher voltage (e.g., 540 $V_{dc}$), DC network 11 that supplies power to electrical loads associated with a gas turbine engine 50 and a second, lower voltage (e.g., 270 $V_{dc}$), DC network 12 that supplies platform electrical loads. The first DC network 11 is supplied with power, via rectifiers 16, 17, from first and second electrical generators 13, 14 that are coupled to the high-pressure (HP) and low-pressure (LP) spools of the gas turbine engine 50. The first DC network is also supplied with power by an energy storage system, ESS, 15, and a first DC:DC power converter 100a is connected between the terminals of the ESS 15 and the first DC network 11 to account for variation in the terminal voltage of the ESS 15 as it charges and discharges. A second DC:DC power converter 100b is connected between the first and second DC networks 11, 12 for power exchange therebetween. Depending on the configuration of the DC:DC converters 100*a*, 100*b*, power flow may be unidirectional or bi-directional. The system further includes a control system 150, as described previously.

FIG. 7B shows, in schematic form, a purely electrical power and propulsion system 20 of an aircraft. The system 20 includes a propulsor 21 (e.g., a propeller or fan), whose rotation is driven by an electrical machine 22. The electrical machine 22 receives electrical power from a DC network 24 via a DC:AC power converter 23. The DC network 24 is supplied with power by an energy storage system 25. A DC:DC converter 100 provides an interface between the energy storage system 25 and the DC network 24. Control of the system is performed by the control system 150.

FIG. 7C shows, again in schematic form, a hybrid electrical power and propulsion system 30 of an aircraft. The system 20 includes a propulsor 31 whose rotation is driven by an electrical machine 32. The electrical machine 32 receives electrical power from a DC network 34 via a DC:AC power converter 33. The DC network 34 is supplied with power by two sources: an energy storage system 35 and a generator set including a gas turbine engine 38, an electrical generator 37 coupled to a shaft of the gas turbine engine 37 and a rectifier 36. A DC:DC converter 100 provides an interface between the energy storage system 35 and the DC network 34. The DC:DC converter 100 may be bi-directional to facilitate charging of the energy storage system 35 using power from the generator set, in addition to discharge of the battery to the DC network 34. Control of the system is performed by the control system 150. Those skilled in the art will recognise the propulsion system 30 of FIG. 7C to be of the series hybrid type. Other hybrid electric propulsion systems are of the parallel type, while still others are of the turboelectric type or have features of more than one type.

FIG. 8A shows an aircraft 1 that includes first and second gas turbine engines 50*a*, 50*b*. The engines 50*a*, 50*b* are associated with electrical power systems 10*a*, 10*b*, which may of the type shown in FIG. 7A or a variant thereof. As illustrated by the dotted lines, the electrical power systems 10*a*, 10*b* may be connected. For example, each electrical power system 10*a*, 10*b* may have a platform DC electrical network 12 and these may be connected or connectable via bus ties. The gas turbine engines may be of any suitable configuration, for example they may be two-spool, three-spool or geared turbofans having one, two or more shaft-coupled electrical machines 13, 14.

FIG. 8B shows a vertical take-off and landing (VTOL) aircraft. The VTOL aircraft has an electric or hybrid electric power and propulsion system, for example of the types shown in FIGS. 7B and 7C. In this exemplary configuration, the VTOL aircraft has front propulsors 21*f* coupled to a front flight surface and rear propulsors 21*r* coupled to a rear flight surface. The flight surfaces 26, 27 are capable of tilting between a lift configuration (shown) and a forward flight configuration in which the propulsors 21*f*, 21*r* face forward. In other examples, the propulsors 21*f*, 21*r* may instead tilt relative to fixed flight surfaces 26, 27.

FIG. 9 is a flow chart illustrating a method 200 of operating an electrical power system that comprises a reconfigurable DC:DC converter 100 of the type described herein. The electrical power system may be an aircraft electrical power system, for example one of the types shown in FIGS. 7A-7C. Alternatively, it may be an electrical power system for another transport application (e.g., a vehicle, ship, or train) or of a non-transport application. The reconfigurable DC:DC converter 100 is connected, at one side, to a DC power source, which may be an energy storage system (e.g., ESS 15) or a DC electrical network (e.g., DC network 11). At another DC side of the reconfigurable DC:DC converter 100 is connected to a DC electrical network (e.g., DC network 12). The method 200 may take place under the control of a control system 150, which may take any desired form suitable for the application, e.g., a distributed control system or a single controller.

At the start of the method 200, the electrical power system 200 is operating in a normal condition. In other words, it is functioning as intended with no faults. Generally, the method 200 starts with the reconfigurable DC:DC converter 100 in the resonant LLC configuration, i.e., the first state. However, in other examples the reconfigurable DC:DC converter 100 may be in the, e.g., DAB converter configuration, i.e., the second state.

At 210, the control system 150 monitors one or more operating conditions of the electrical power system. This may include any one or more of the following:

The control system 150 may monitor the DC network for faults. For example, the control system 150 may receive a measurement indicative of a voltage between the DC terminals of the converter 100 facing the DC network and monitor the voltage. A sudden drop in the voltage may be indicative of a fault. As another example, the control system 150 may receive one or more other voltage and/or current measurements in the DC network and diagnose faults on the basis of these measurements.

The control system 150 may monitor the electrical power demand associated with one or more electrical loads that are supplied with power by the DC network. For example, the control system 150 may monitor the total electrical power demand of all loads supplied by the DC network.

The control system 150 may monitor a voltage demand associated with one or more electrical loads that are supplied with power by the second DC network. For example, the control system 150 may monitor a voltage demand or requirement of a power distribution bus of the DC electrical network.

At 220, the control system 150 determines that there has been a change in one or more of the operating conditions monitored in step 210. For example:

The control system 150 may determine that there is a fault in the DC electrical network in response to the monitored voltage dropping to zero or near zero.

The control system 150 may determine that the electrical power demand and/or voltage demand has passed a threshold. For example, the electrical power demand may have exceeded a first threshold or dropped below a second threshold.

At 230, the control system 150 controls the switch arrangement 132 to change the configuration of the DC:DC converter 100. For example:

If the DC:DC converter 100 started the method 200 in the first state (resonant LLC mode) and the control system 150 determines that there is a fault in the second DC electrical network, the control system 150 may control the switch arrangement 132 to switch the converter 100 to the second switch state. This may provide access to the fault current control techniques described with reference to FIGS. 5A-5B and FIG. 6.

If the DC:DC converter 100 started the method 200 in the first state (resonant LLC mode) and the control system 150 determines that the electrical power demand and/or voltage demand has dropped below a threshold power/voltage level, the control system 150 may control the switch arrangement 132 to switch the converter 100 to the second switch state. This may allow operation below the resonant frequency of the LLC configuration without the associated impedance penalty that would result in increased transistor switching losses and increasing heating of the transformer 135.

If the DC:DC converter 100 started the method 200 in the second state (e.g., DAB mode) and the control system 150 determines that the electrical power demand and/or voltage demand has exceeded a threshold power/voltage level, the control system 150 may control the switch arrangement 132 to switch the converter 100 to the first switch state (resonant LLC mode). The threshold may be selected so that the switch occurs at the frequency where the impedance associated with the first state is equal to or has dropped below the impedance of the second state, i.e., close to the resonant frequency. Thus, the system benefits from the highly efficient resonant LLC mode where it is the most efficient mode available.

In each of the above examples, the control system 150 may time the switch to occur at an instant in the AC cycle where the voltage on the capacitor 131 is at or near to its zero-crossing point, and thus has minimum stored energy. This may reduce the inrush current transient experienced by the switch arrangement 132 when it switches.

In some examples, the method 200 proceeds back to step 210 where the control system 210 monitors one or more operating conditions of the electrical power system. This may result in the control system 150 again switching the state of DC:DC converter 100, for example if the power or voltage demand again crosses a threshold.

In other examples, where a fault has been detected in the second DC network, the method 200 optionally proceeds to step 240. Here, the control system 150 controls the switching operations of the transistors of one or both of the DC:AC converter circuit 110 and AC:DC converter circuit 120 to control an amount of fault current fed to the faulted second DC network. For example, in the second state of the converter 100, the control system 150 may use in any or more of the techniques described above with reference to FIGS. 5A-5B and FIG. 6.

The method 200 may optionally proceed to step 250. Here, the control system 150 isolates the fault in the second DC network. For example, the control system 150 may open one or more DC contactors, or operate one or more Solid State Circuit Breakers (SSCBs), to isolate the part of the second DC network that includes the fault.

Having isolated the fault, the method may return to step 210 where the control system 210 monitors one or more operating conditions of the electrical power system. This may result in the control system 150 again switching the state of DC:DC converter 100, for example if the control system 150 determines that the remaining part of the second DC network that is connected to the converter 100 is no longer subject to a fault.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It will also be appreciated that while the invention has been described with reference to aircraft and aircraft propulsion systems, the techniques described herein could be used for many other applications. These include, but are not limited to, automotive, marine and land-based applications.

The invention claimed is:

1. An electrical power system comprising a DC power source, a DC electrical network and a DC:DC power electronics converter, the DC:DC power electronics converter comprising:

a DC:AC converter circuit having a DC side and an AC side, the DC side of the DC:AC converter circuit connected to the DC power source;

an AC:DC converter circuit having a DC side and an AC side, the DC side of the AC:DC converter circuit connected to the DC electrical network;

an AC link connecting the AC side of the DC:AC circuit and the AC side of the AC:DC converter circuit, the AC link including a transformer having a first winding connected to the AC side of the DC:AC converter circuit and a second winding connected to the AC side of the AC:DC converter;

a capacitor; and a switch arrangement having a first state and a second state, wherein:

in the first state, the capacitor is connected in series between the AC side of the DC:AC converter circuit and the first winding of the transformer; and in the second state, there is a current path between the AC side of the DC:AC converter circuit and the first winding of the transformer that does not include the capacitor, wherein the electrical power system further comprises a control system configured to:

monitor an operating condition of the DC electrical network; and change the state of the switch arrangement in response to determining a change in the operating condition of the DC electrical network;

the DC:AC converter circuit comprises a first plurality of transistors, the control system is configured to control a switching operation of the first plurality of transistors, and the control system is further configured to, responsive to a determination that there is a fault in the DC electrical network:

switch the switch arrangement from the first state to the second state; and control the switching operation of the first plurality of transistors to control an amount of current fed to the DC electrical network through the DC:DC converter;

controlling the switching operation of the first plurality of transistors to control an amount of current fed to the DC electrical network through the DC:DC converter comprises one of more of:

increasing a switching frequency of the first plurality of transistors to increase an impedance of the AC link of the DC:DC converter;

modifying the switching operation of the first plurality of transistors so that a waveform of a voltage applied to the first winding of the transformer changes from a square wave to a quasi-square wave; and modifying the switching operation of the first plurality of transistors so that a duty cycle of a waveform of a voltage applied to the first winding of the transformer changes.

2. The electrical power system of claim 1, wherein the switch arrangement is normally in the first state and the control system is configured to switch the switch arrangement from the first state into the second state in response to a determination that there is a fault in the DC electrical network.

3. The electrical power system of claim 1, wherein the AC:DC converter circuit comprises a second plurality of transistors, the control system is configured to control a switching operation of the second plurality of transistors, and the control system is further configured, responsive to a determination that there is a fault in the DC electrical network, to control the switching operation of the second plurality of transistors to control an amount of current fed to the DC electrical network through the DC:DC converter.

4. The electrical power system of claim 3, wherein controlling the switching operation of the second plurality of transistors to control an amount of current fed to the DC electrical network through the DC:DC converter comprises:

controlling the switching operation of the second plurality of transistors of the AC:DC converter circuit to repeatedly switch the AC:DC converter circuit between a fault feeding configuration and a crowbar configuration, wherein in the fault feeding configuration, a low-side transistor and a high-side transistor of the AC:DC converter circuit are switched on, and current passes through the AC:DC converter circuit to the DC electrical network, wherein in the crowbar configuration, only low-side transistors or only high-side transistors of the AC:DC converter circuit are switched on, and current is contained within the AC:DC converter circuit and does not pass to the DC electrical network.

5. The electrical power system of claim 1, wherein the control system is configured to control the state of the switch arrangement based on an electrical power demand of one or more loads supplied by the DC electrical network.

6. The electrical power system of claim 5, wherein the control system is configured to:

switch the switch arrangement from the first state to the second state in response to the electrical power demand passing below a first power demand threshold; and/or switch the switch arrangement from the second state to the first state in response to the electrical power demand exceeding a second power demand threshold.

7. The electrical power system of claim 1, wherein the switch arrangement comprises a mechanical contactor or a semiconductor switch connected in parallel with the capacitor.

8. The electrical power system of claim 1, wherein the switch arrangement comprises two reverse-series connected transistors connected in parallel with the capacitor.

9. The electrical power system of claim 1, wherein the DC:DC power electronics converter further comprises a second capacitor and a second switch arrangement having a first state and a second state, wherein:

in the first state of the second switch arrangement, the second capacitor is connected between the AC side of the AC:DC converter circuit and the second winding of the transformer;

in the second state of the second switch arrangement, there is a current path between the AC side of the AC:DC converter circuit and the second winding of the transformer that does not include the second capacitor.

10. The electrical power system of claim 1, wherein:

the DC:AC converter circuit is an active converter circuit and the AC:DC converter circuit is a passive diode rectifier; or the DC:AC converter and the AC:DC converter circuit are active converter circuits.

11. The electrical power system of claim 1, wherein the DC:AC converter circuit and the AC:DC converter circuit are bi-directional converter circuits.

12. The electrical power system of claim 1, wherein the first winding of the transformer has a first number of turns and the second winding of the transformer has a second number of turns different from the first number of turns.

13. An aircraft comprising the electrical power system of claim 1.

14. A method of operating an electrical power system, the electrical power system comprising:

a control system;

a DC power source;

a DC electrical network; and a DC:DC power electronics converter, the DC:DC power electronics converter comprising:

a DC:AC converter circuit having a DC side and an AC side, the DC side of the DC:AC converter circuit connected to the DC power source;

an AC:DC converter circuit having a DC side and an AC side, the DC side of the AC:DC converter circuit connected to the DC electrical network;

an AC link connecting the AC side of the DC:AC circuit and the AC side of the AC:DC converter circuit, the AC link including a transformer having a first winding connected to the AC side of the DC:AC converter circuit and a second winding connected to the AC side of the AC:DC converter;

a capacitor; and a switch arrangement having a first state and a second state, wherein: in the first state, the capacitor is connected in series between the AC side of the DC:AC converter circuit and the first winding of the transformer; and in the second state, there is a current path between the AC side of the DC:AC converter circuit and the first winding of the transformer that does not include the capacitor, the method comprising:

determining, by the control system, a change in an operating condition of the DC electrical network; and in response to determining the change in the operating condition of the DC electrical network, changing the state of the switch arrangement; wherein the DC:AC converter circuit comprises a first plurality of transistors, the control system is configured to control a switching operation of the first plurality of transistors, and the control system is further configured to, responsive to a determination that there is a fault in the DC electrical network:

switch the switch arrangement from the first state to the second state; and control the switching operation of the first plurality of transistors to control an amount of current fed to the DC electrical network through the DC:DC converter;

controlling the switching operation of the first plurality of transistors to control an amount of current fed to the DC electrical network through the DC:DC converter comprises one of more of:

increasing a switching frequency of the first plurality of transistors to increase an impedance of the AC link of the DC:DC converter;

modifying the switching operation of the first plurality of transistors so that a waveform of a voltage applied to the first winding of the transformer changes from a square wave to a quasi-square wave; and modifying the switching operation of the first plurality of transistors so that a duty cycle of a waveform of a voltage applied to the first winding of the transformer changes.

15. The method of claim 14, wherein determining the change in the operating condition of the DC electrical network comprises one or more of:

determining that there is a fault in the DC electrical network;

determining that an electrical power demand associated with one or more loads supplied by the DC electrical network has changed;

determining that a voltage demand of the DC electrical network has changed.

16. The method of claim 14, wherein the control system changes the state of the switch arrangement when a voltage across the capacitor is at a minimum during an AC cycle of the AC link.

17. An electrical power system comprising a DC power source, a DC electrical network and a DC:DC power electronics converter, the DC:DC power electronics converter comprising:

a DC:AC converter circuit having a DC side and an AC side, the DC side of the DC:AC converter circuit connected to the DC power source;

an AC:DC converter circuit having a DC side and an AC side, the DC side of the AC:DC converter circuit connected to the DC electrical network;

an AC link connecting the AC side of the DC:AC circuit and the AC side of the AC:DC converter circuit, the AC link including a transformer having a first winding connected to the AC side of the DC:AC converter circuit and a second winding connected to the AC side of the AC:DC converter;

a capacitor; and a switch arrangement having a first state and a second state, wherein:

in the first state, the capacitor is connected in series between the AC side of the DC:AC converter circuit and the first winding of the transformer; and in the second state, there is a current path between the AC side of the DC:AC converter circuit and the first winding of the transformer that does not include the capacitor, wherein the electrical power system further comprises a control system configured to:

monitor an operating condition of the DC electrical network; and change the state of the switch arrangement in response to determining a change in the operating condition of the DC electrical network;

the AC:DC converter circuit comprises a second plurality of transistors, the control system is configured to control a switching operation of the second plurality of transistors, and the control system is further configured, responsive to a determination that there is a fault in the DC electrical network, to control the switching operation of the second plurality of transistors to control an amount of current fed to the DC electrical network through the DC:DC converter;

controlling the switching operation of the second plurality of transistors to control an amount of current fed to the DC electrical network through the DC:DC converter comprises controlling the switching operation of the second plurality of transistors of the AC:DC converter circuit to repeatedly switch the AC:DC converter circuit between a fault feeding configuration and a crowbar configuration, in the fault feeding configuration, a low-side transistor and a high-side transistor of the AC:DC converter circuit are switched on, and current passes through the AC:DC converter circuit to the DC electrical network, and in the crowbar configuration, only low-side transistors or only high-side transistors of the AC:DC converter circuit are switched on, and current is contained within the AC:DC converter circuit and does not pass to the DC electrical network.

* * * * *